(12) United States Patent
Lamy-Bergot et al.

(10) Patent No.: US 9,185,436 B2
(45) Date of Patent: Nov. 10, 2015

(54) METHOD AND SYSTEM FOR DETERMINING CODING PARAMETERS ON VARIABLE-RESOLUTION STREAMS

(75) Inventors: Catherine Lamy-Bergot, Colombes (FR); Benjamin Gadat, Toulouse (FR); Sébastien Marcille, Colombes (FR); Erwann Renan, Colombes (FR)

(73) Assignee: THALES, Courbevoie (FR)

( * ) Notice: Subject to any disclaimer, the term of this patent is extended or adjusted under 35 U.S.C. 154(b) by 743 days.

(21) Appl. No.: 13/514,677

(22) PCT Filed: Dec. 10, 2010

(86) PCT No.: PCT/EP2010/069384
§ 371 (c)(1), (2), (4) Date: Aug. 29, 2012

(87) PCT Pub. No.: WO2011/070157
PCT Pub. Date: Jun. 16, 2011

(65) Prior Publication Data
US 2013/0044807 A1    Feb. 21, 2013

(30) Foreign Application Priority Data

Dec. 11, 2009    (FR) ..................................... 09 06007

(51) Int. Cl.
*H04N 21/2343*    (2011.01)
*H04N 21/2385*    (2011.01)
(Continued)

(52) U.S. Cl.
CPC ..... *H04N 21/234327* (2013.01); *H04N 19/124* (2014.11); *H04N 19/136* (2014.11); *H04N 19/146* (2014.11); *H04N 19/154* (2014.11); *H04N 19/166* (2014.11); *H04N 19/172* (2014.11); *H04N 19/177* (2014.11); *H04N 19/196* (2014.11); *H04N 19/29* (2014.11); *H04N 19/37* (2014.11); *H04N 19/50* (2014.11);
(Continued)

(58) Field of Classification Search
None
See application file for complete search history.

(56) References Cited

U.S. PATENT DOCUMENTS

| 2003/0135863 A1 | 7/2003 | Van Der Schaar |
| 2005/0175084 A1 | 8/2005 | Honda et al. |

(Continued)

FOREIGN PATENT DOCUMENTS

| EP | 2051525 A1 | 4/2009 |
| FR | 2903253 A1 | 1/2008 |
| FR | 2936926 A1 | 4/2010 |

OTHER PUBLICATIONS

Liqiao Han, et al., "Cross Layer Optimization for Scalable video Multicast Over 802.11 WLANs", 2007 4th IEEE Consumer Communications and Networking Conference, Jan. 11-13, 2007, pp. 838-843, Las Vegas, NV, USA, XP002592829.

(Continued)

*Primary Examiner* — Joseph Ustaris
*Assistant Examiner* — Kevin McInnish
(74) *Attorney, Agent, or Firm* — Baker & Hostetler LLP

(57) ABSTRACT

A method of determining the coding parameters of a variable-resolution video stream by a video coder, said video stream including multiple resolution layers and being compressed so as to be transmitted at a given rate or a given quality through a heterogeneous network to multiple users, said method including a classification step to associate each resolution level with a group of users and to determine the optimal coding parameters for each resolution level as a function of the requirements of each group of users.

9 Claims, 12 Drawing Sheets

(51) Int. Cl.

| | | |
|---|---|---|
| *H04N 21/24* | (2011.01) | |
| *H04N 21/258* | (2011.01) | |
| *H04N 21/2662* | (2011.01) | |
| *H04N 19/50* | (2014.01) | |
| *H04N 19/172* | (2014.01) | |
| *H04N 19/196* | (2014.01) | |
| *H04N 19/61* | (2014.01) | |
| *H04N 19/37* | (2014.01) | |
| *H04N 19/124* | (2014.01) | |
| *H04N 19/136* | (2014.01) | |
| *H04N 19/146* | (2014.01) | |
| *H04N 19/154* | (2014.01) | |
| *H04N 19/166* | (2014.01) | |
| *H04N 19/177* | (2014.01) | |
| *H04N 19/29* | (2014.01) | |
| *H04N 19/895* | (2014.01) | |
| *H04N 19/67* | (2014.01) | |

(52) U.S. Cl.
CPC ............... *H04N19/61* (2014.11); *H04N 19/67* (2014.11); *H04N 19/895* (2014.11); *H04N 21/2385* (2013.01); *H04N 21/2402* (2013.01); *H04N 21/25866* (2013.01); *H04N 21/2662* (2013.01)

(56) References Cited

U.S. PATENT DOCUMENTS

| | | | |
|---|---|---|---|
| 2006/0098738 A1* | 5/2006 | Cosman et al. | 375/240.16 |
| 2008/0069201 A1* | 3/2008 | Zhu et al. | 375/240.1 |
| 2009/0304070 A1 | 12/2009 | Lamy-Bergot et al. | |
| 2010/0189183 A1* | 7/2010 | Gu et al. | 375/240.28 |
| 2011/0051806 A1* | 3/2011 | Lee | 375/240.03 |
| 2011/0268187 A1 | 11/2011 | Lamy-Bergot et al. | |

OTHER PUBLICATIONS

Cyril Bergeron et al., "Modelling H.264/AVC Sensivitity for Error Protection in Wireless Transmissions", 2006 IEEE 8th Workshop on Multimedia Signal Processing, Oct. 3-6, 2006, pp. 302-305, Victoria, CA, XP002592830.

Zhou Wang et al., "Image Quality Assessment: From Error Visibility to Structural Similarity", IEEE Transactions on Image Processing, Apr. 1, 2004, pp. 600-612, vol. 13, No. 4, IEEE Service Center, Piscataway, NJ, USA, XP011110418.

Cyril Bergeron et al., "Compliant Selective Encryption for H.264/AVC Video Streams", Proc. Int. Workshop on Multimedia Processing, Oct.-Nov. 2005, pp. 477-480, Shanghai, China.

Joachim Hagenauer, "Rate-Compatible Punctured Convolutional Codes (RCPC Codes) and their Applications", IEEE Transactions on Communications, Apr. 1988, pp. 389-400, vol. 36, No. 4.

* cited by examiner

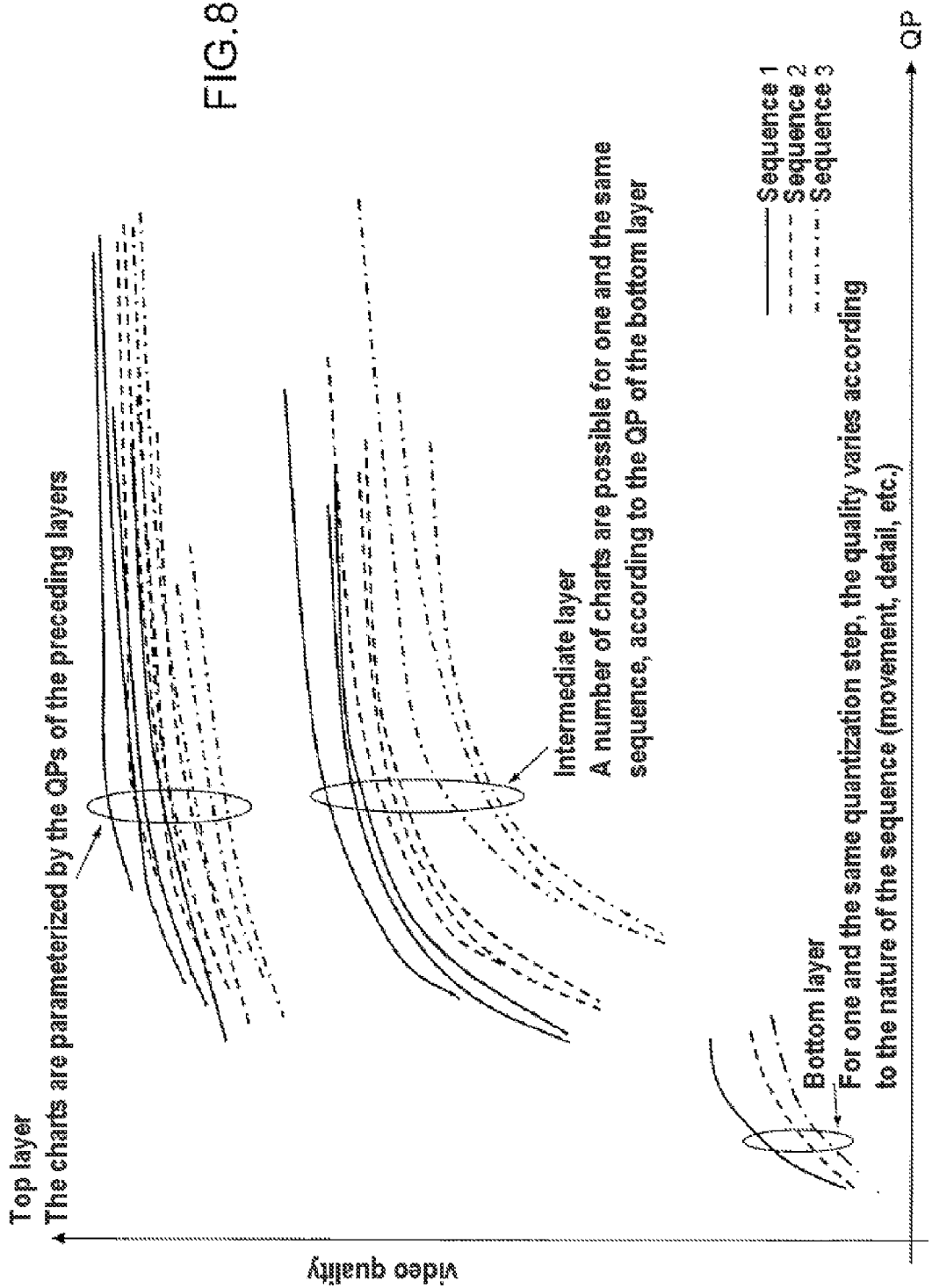

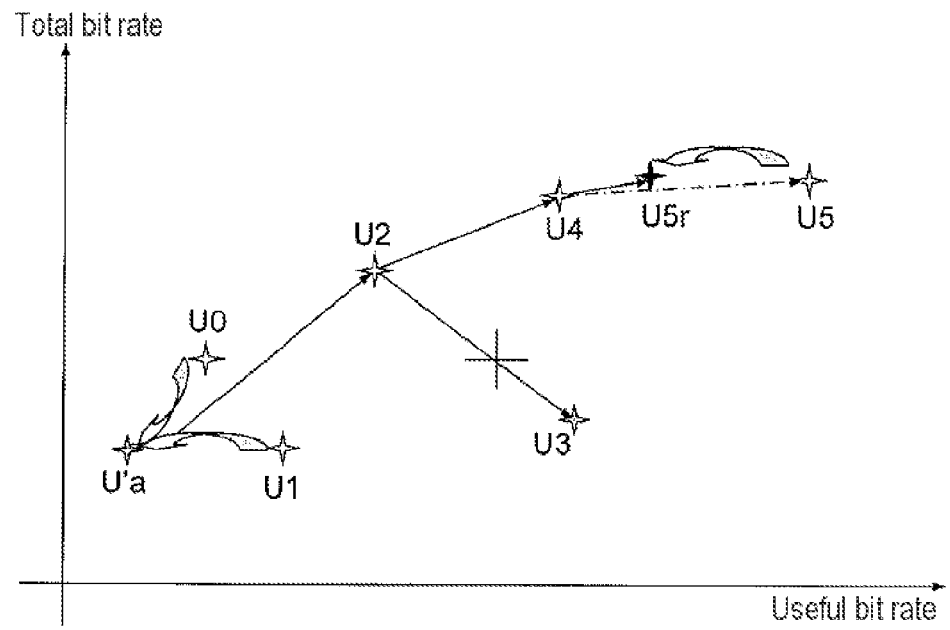
FIG.9bis
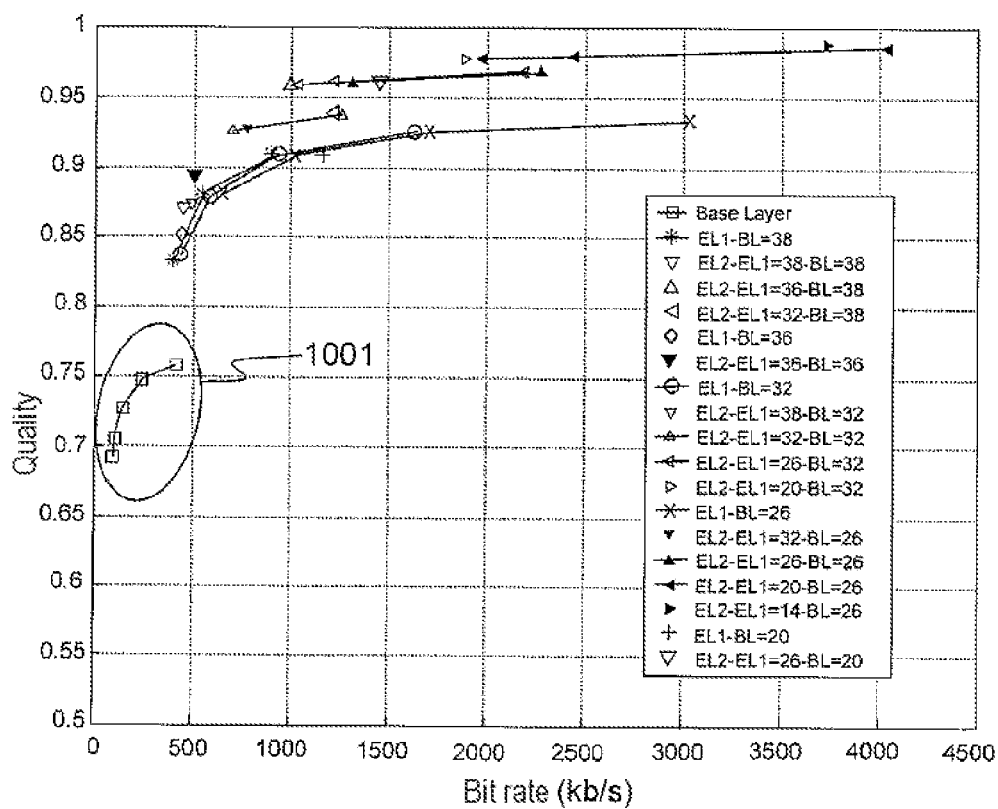
FIG.10a

METHOD AND SYSTEM FOR DETERMINING CODING PARAMETERS ON VARIABLE-RESOLUTION STREAMS

CROSS-REFERENCE TO RELATED APPLICATIONS

This application is a National Stage of International patent application PCT/EP2010/069384, filed on Dec. 10, 2010, which claims priority to foreign French patent application No. FR 09 06007, filed on Dec. 11, 2009, the disclosures of each of which are incorporated by reference in their entireties.

FIELD OF THE DISCLOSED SUBJECT MATTER

The present invention relates to the issue of optimizing the link budget of a multimedia communication. It proposes a control method making it possible notably to effectively determine the best allocation of the available bit rate between, on the one hand, the compression of the video data and, on the other hand, the protection of these data, for example by the insertion of correcting codes. The allocation is performed in order to provide the best perceived quality for one or more users according to the transmission conditions or to provide a given quality at a minimal used bit rate.

The invention applies in particular to a video sequence compressed by a source coder that has the facility to produce a number of nested subsets each of which corresponds to a resolution, temporal or spatial, that is different from the resolution of the initial sequence. This process is called "scalability". Each resolution may be transmitted and/or decoded independently and by different users. The benefit of this method lies in the matching of the compression parameters to the transmission conditions of the different users. To this end, the invention also applies to the field of the broadcasting of video signals through imperfect transmission channels, that is to say channels that are subject to transmission errors and/or to a variable and constrained available bit rate.

BACKGROUND

The objective of the invention is notably to propose a dynamic and adaptive method for controlling the compression parameters for a compressed video stream having a number of spatial or temporal scalability levels which correspond to different resolutions. Such a method makes it possible to adapt the bit rate of the video stream to be transmitted to a number of users or to a single user via a transmission channel which experiences available bit rate variations which are significant over time. Another objective of the invention is to perform an optimized allocation of the bit rate between, on the one hand, the compression and, on the other hand, the protection. The criterion retained, in all cases, to produce the optimization according to the invention is the quality perceived by the user or users.

In the case of a multimedia communication over a link that has a constrained bit rate and is subject to propagation errors, the optimization relative to a nominal operating point of the system is broadly sub-optimal because it does not take into account the variations of the conditions of the transmission channel, nor does it take into account the content of the multimedia stream to be transmitted.

The methods and the devices according to the prior art do not make it possible to adapt rapidly to the variations of the transmission conditions notably in the case of a wireless transmission. The coding parameters are generally determined for a given operating point, typically corresponding to an authorized/available average bit rate for a rate of losses or of residual errors undergone by the transmitted stream. When the transmission conditions are better than the retained operating point, a portion of the available bit rate is pointlessly allocated to the protection of the transmitted stream, whereas it could either be saved, or be used to send at a higher useful bit rate. Conversely, when the transmission conditions are less good than the retained operating point, an excessive proportion of the bit rate is employed by the unprotected useful data, which leads to inevitable losses in reception, that is to say that a portion of the data cannot be protected because the bit rate allocation for the protection in practice proves inadequate.

Another known solution which targets the problem of the variation of the transmission conditions relates to the adaptive coding and modulation (ACM) methods. These methods are based on an adaptation of the channel modulation and coding schemes according to the transmission conditions. One of their drawbacks is that they do not make it possible to take into account and modify the content of the stream to be transmitted to adapt it to the constraints of the channel. The adaptation in this case mainly has the effect of modifying the rate of transmission of the data which can lead to delay and jitter problems notably when the transmission is done at constant bit rate.

Nor do the prior art solutions take into account the particular feature of the video stream to be transmitted which can be represented at a number of resolution levels. Such a compressed stream offering the temporal or spatial scalability can be exploited to adapt the source to the requirements of each user in the case of a transmission through a heterogeneous network.

In order to overcome the limitations of the prior art solutions, the invention proposes a method that makes it possible to determine, optimally, compression parameters including the source bit rate, the protection rate and the resolution level of a compressed video sequence transmitted through a heterogeneous network and to a number of users. The determination of the parameters is done, notably, according to the needs of the users and the constraints, known a priori, of the transmission channels. The proposed method is implemented, for example, through a device called associated controller, the object of which is to determine and supervise said compression parameters.

The method according to the invention also makes it possible, for a given user receiving a compressed stream offering a temporal or spatial scalability, to assist in the decision regarding the choice of the subset to be decoded as a function of the perceived final quality. Furthermore, the invention remains compatible notably with the prior art solutions of ACM type for which it acts as a complement to the protection provided by this type of solution. With an ACM method causing the bit rate of the transmission channel to be made variable, the method according to the invention adapts, in this case, the useful bit rate of the transmitted stream according to the variable bit rate of the channel.

The benefit of the invention is notably that it provides tools allowing for the objective comparison of the perceived quality for each resolution transmitted in the compressed stream and thus makes it possible to assist in the decision of the choices of compression parameters associated with each resolution.

SUMMARY

To this end, the subject of the invention is method for determining coding parameters of a variable-resolution video stream by a video coder, said video stream consisting of a plurality (C) of resolution layers and being compressed to be transmitted at a plurality of given bit rates or a plurality of given qualities through a heterogeneous network to a plurality (K) of users (Ui), characterized in that it comprises at least the following steps:

generating reference charts with which to determine compression parameters, at least the quantization step (QP), and/or protection parameters, at least the protection efficiency, as a function of the useful bit rate on the one hand and of the perceived quality on the other hand, initializing the parameters representative of said video coder, at least the maximum number $C_{max}$ of resolution layers, the minimum acceptable quality $D_{min}$ and the maximum achievable quality $D_{max}$ for each of said resolutions, determining, for each user (Ui) associated with a transmission link having an available bit rate $d_i$ and a probability of error $Pe_i$, and for each available resolution $C_j$, the pair {useful bit rate, protection efficiency} which offers the best perceived quality on the basis of said reference charts, retaining, for each user (Ui), the resolution $C_{best}$ which offers the best perceived quality and representing said user (Ui) in the x-axis plane equal to the useful bit rate and y-axis plane equal to the total bit rate, excluding from said representation the users $U_i$ which have a perceived quality value below the acceptable minimum threshold $D_{min}$, evaluating the function f which links the useful bit rate to the total bit rate on the basis of the representation of said users (Ui), if the function f is strictly increasing for all the users (Ui) considered, then ranking the users in homogeneous groups according to the perceived quality, the users of one and the same group being associated with the same resolution $C_{best}$, if the function f is not strictly increasing for at least two consecutive users (U0,U1), executing at least one of the following steps:
  i. modifying the choice of the resolution retained in the step for at least one of said users (U0,U1),
  ii. replacing said users (U0,U1) with a virtual user (U'a) for which the total bit rate is equal to the lowest total bit rate of said users (U0,U1) and for which the protection efficiency is equal to the minimum protection efficiency of said users (U0,U1),
  iii. eliminating from the ranking, the user which has the highest total bit rate, determining, for each resolution layer of index i and in ascending order of the resolution level, the compression parameters, at least the quantization step (QP), and the protection parameters, at least the efficiency (R) of the correcting code, on the basis of the reference charts, the quantization step (QP) being determined relative to the lowest available bit rate among the transmission links of the group of users to which said resolution layer of index i is assigned, the efficiency (R) of the correcting code being determined as being the lowest efficiency among those allocated to the users of said group, compressing said video stream by applying said determined compression parameters, protecting said video stream by applying said protection parameters to it.

In a variant embodiment of the invention, said compressed video stream consists at least of I frames and of P frames and the perceived quality is determined on the basis of the following relationship:

$$\hat{D}_{gop} = \prod_{i=0}^{N} \prod_{k=1}^{C} (1-P_e)^{\beta_{i,k} \cdot n_{i,k}} \cdot D_0 + \sum_{i=0}^{N} \sum_{k=1}^{C} \left[ \prod_{j=0}^{N} \prod_{l=1}^{k-1} (1-P_e)^{\beta_{i,k} \cdot n_{i,l}} \prod_{j=0}^{i-1} (1-P_e)^{\beta_{j,k} \cdot n_{j,k}} (1 - (1-P_e)^{\beta_{i,k} \cdot n_{i,k}}) D_{loss_{i,k}} \right],$$

in which N is the number of images in a group of images (GOP), C is the number of resolution layers, $n_{i,k}$ is the size of the $k^{th}$ resolution layer of the $i^{th}$ P frame, $D_{loss\ i,k}$ is the distortion observed when the $k^{th}$ resolution layer of the $i^{th}$ P frame is lost whereas the preceding frames are correct, $D_0$ is the average distortion of a group of images without error, $\beta_{i,k}$ is a predefined parameter, $P_e$ is the probability of error on the transmission link.

In a variant embodiment of the invention, the distortion $D_0$ is equal to the signal-to-noise ratio PSNR.

In a variant embodiment of the invention, the distortion $D_0$ is determined as the difference between said compressed video stream at a given resolution and said noncompressed video stream at the maximum resolution among those available.

In a variant embodiment of the invention, said homogeneous groups are determined in such a way that a given minimum quality difference exists between each group.

In a variant embodiment of the invention, the method according to the invention also comprises a step for checking the choices of compression parameters, which consists at least in determining the perceived quality metric of the video stream and checking that this metric is greater than $D_{min}$ and less than $D_{max}$.

In a variant embodiment of the invention, the method according to the invention also comprises a step of adding additional protection (910) using a correcting coding mechanism allowing for incremental redundancy.

In a variant embodiment of the invention, said video stream has a variable spatial and/or temporal resolution and/or variable resolution in terms of quality.

Also the subject of the invention is a system for determining coding parameters of a variable-resolution video stream, characterized in that it comprises at least a video coder and an associated control device suitable for driving said video coder by executing at least the steps of the method according to the invention.

BRIEF DESCRIPTION OF THE DRAWINGS

Other features will become apparent on reading the following detailed description, given as a nonlimiting example in light of the appended drawings which represent.

DETAILED DESCRIPTION

The most advanced video compression standards propose methods for hierarchically organizing the data of a compressed video stream according to the resolution level, temporal or spatial, with which the video sequence will, after decoding, actually be displayed.

Figure 1:
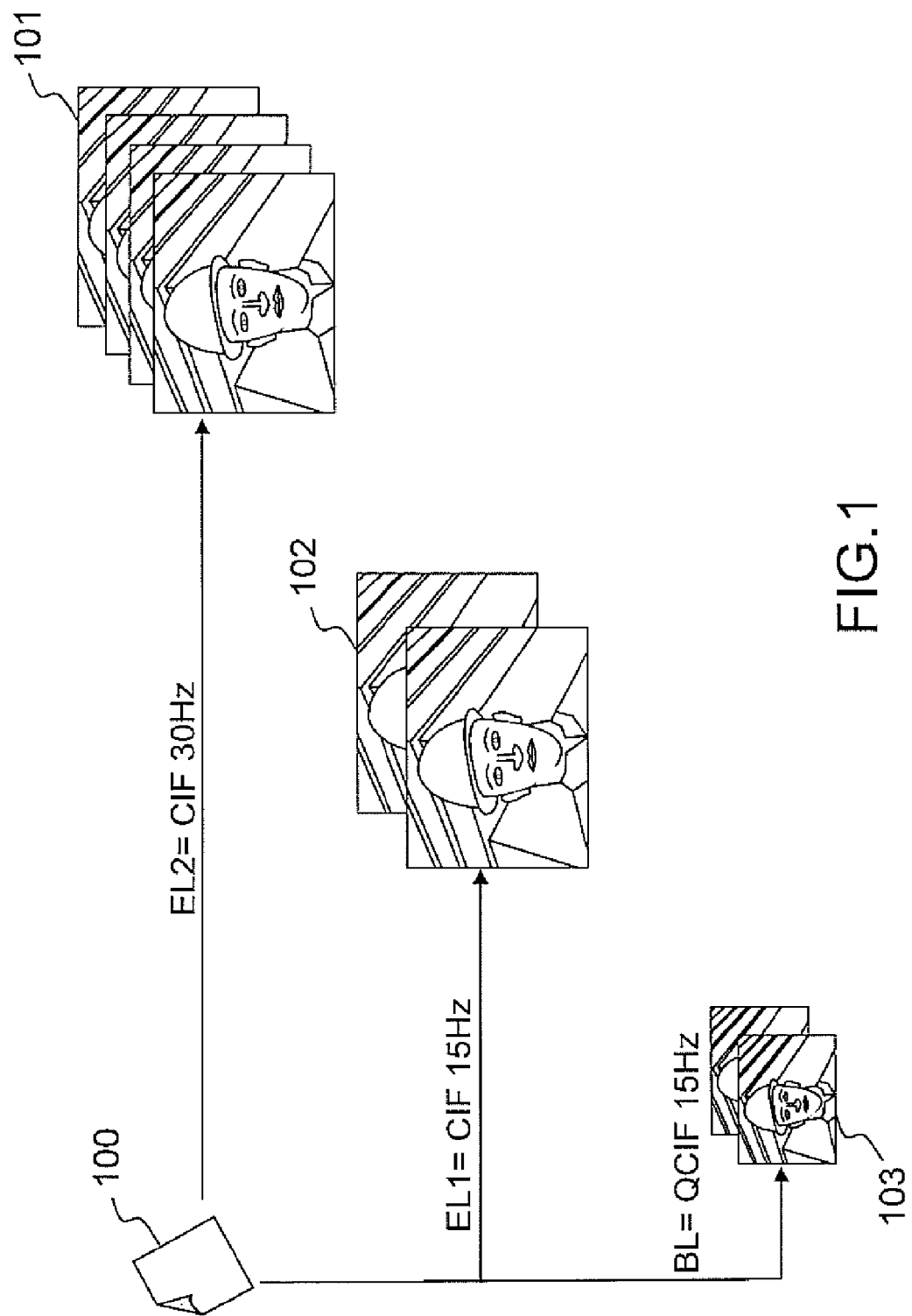
FIG. 1, an illustration of the principle of temporal and spatial scalability of a compressed video stream, FIG. 2, an exemplary calculation of a quality estimation metric used by the method according to the invention, FIG. 3, the illustration of the impact, in terms of variation of the video quality, of the loss of frames in a GOP; this quality is evaluated by a measurement of the distortions corresponding to frame losses or PSNR on partial GOP, FIG. 4, the principle of a first type of chart representing the video quality as a function of the quantization steps, FIG. 5, the principle of a second type of charts schematically representing the bit rate expressed as a function of the quantization steps, FIG. 6, a method for selecting a quantization step from a reference chart, FIGS. 7a, 7b, 7c and 7d, a refinement of the choice of quantization step to be used when a number of quantization parameters can be used, FIGS. 7e and 7f, two exemplary refinements of the choice of quantization step to be used when a number of quantization parameters are candidates, FIG. 8, an exemplary chart representing the video quality as a function of the quantization steps for a number of resolution layers, FIG. 9, a flow diagram describing the steps of the method according to the invention.

FIG. 1 schematically represents an example of temporal and spatial scalability in a compressed video stream. A video coder 100, for example a coder compliant with the H.264/SVC video compression standard as defined in the reference "ITU-T Rec. H.264|ISO/IEC 14496-10 annex G 2009", can, instead of supplying a single compressed stream corresponding to the original video sequence with a given spatial and temporal resolution, on the contrary, produce a stream which contains a number of nested and hierarchically organized subsets. The first subset contains the information concerning the lowest pair of spatial and temporal resolutions, this first subset commonly being called "base layer". The following subsets contain the additional information that makes it possible, in combination with the preceding layers, to produce a sequence with a higher spatial or temporal resolution level. This is then a layer of extra resolution of level i, i being a strictly positive integer, called "enhancement layer i". FIG. 1 represents an example of the principle of scalability. The base layer 103 corresponds to the original video sequence with the standard spatial resolution QCIF (Quarter Common Intermediate Format) and with the temporal resolution of 15 Hertz. A first level 1 enhancement layer 102 is obtained by adding the information needed to switch from the QCIF spatial resolution to the CIF spatial resolution. Finally, a second, level 2 enhancement layer 101 is obtained by adding to the preceding two layers the information needed to switch from the 15 Hz temporal resolution to the 30 Hz temporal resolution.

Generally, the resolution layers are hierarchically organized so that an enhancement, either of the temporal resolution or of the spatial resolution, or of both at the same time, is performed between a level i layer and a level i+1 layer. In addition to the temporal or spatial scalability, a video coder 100 can also be designed to produce a so-called quality or signal-to-noise ratio (SNR) scalability. This type of scalability has the effect of splitting the compressed stream into a number of layers organized hierarchically according to the perceived quality and, indirectly, the applied compression rate.

Hereinafter in the description, the concept of scalability is illustrated only by temporal or spatial examples, but obviously, the invention, as described, applies equally to a compressed stream having a number of scalability layers in terms of quality alone or in combination with a temporal and/or spatial scalability.

Such a compressed stream having scalability can therefore be decoded with a number of different resolutions. Since each subset is independent of the others, it can also be transmitted over different propagation channels and therefore be subject to losses and/or errors with different statistics.

One of the objectives of the present invention is to optimally and dynamically determine the compression and/or protection parameters associated with a stream of compressed video data that offer temporal and/or spatial scalability. The criterion used to make the allocation of said parameters optimal is the final quality perceived by the user. In a context of video stream broadcasting via a heterogeneous and complex meshed network, the recipient has no knowledge of the video sequence originally transmitted before the latter is affected by the successive compression and transmission steps through a lossy channel. The perceived quality therefore results from an objective estimation, the aim of which is to take the best account of human vision. A measurement conventionally used in the field of the objective evaluation of perceived quality is PSNR, an acronym standing for "peak signal-to-noise ratio", which is a measurement of distortion used in digital imaging and more particularly in image compression. It is defined by:

$$PSNR = 10\log_{10}\left(\frac{255^2}{MSE}\right)$$

in which $$MSE = \sum_{i=1}^{M} \sum_{j=1}^{Q} \frac{(pl^*(i,j) - pl(i,j))^2}{M \times Q},$$

M, Q are the dimensions (width and height) of the video images, and pl(i,j)(pl*) gives the luminance of the pixel at position (i,j), original or reconstructed, in the image.

The measurement of the PSNR presents certain drawbacks when the aim is to measure and compare the perceived quality of one and the same video sequence at different spatial or temporal resolutions as may be the case for a compressed stream that has a resolution hierarchy. In practice, this measurement is based on a comparison of the pixels of two images and requires identical resolutions to be able to make a coherent comparison. Furthermore, even by filtering the lowest resolution in order to be able to compare it with the highest resolution, the influence of the filtering leads to results that are unsatisfactory and uncorrelated with the subjective measurements which are closest to the quality actually perceived by the human eye.

In order to take account of the content of the image as a whole, a metric more finely modeling the behavior of the human eye can be envisaged. An example of implementation of the calculation of an objective perceived quality metric suited to comparing one and the same video sequence at different resolutions is presented in the following paragraph. This example is in no way limiting and it is understood that any type of metric allowing for an objective measurement of the perceived quality for different resolutions can be used in conjunction with the method according to the invention which is the subject of the present application.

Figure 2:
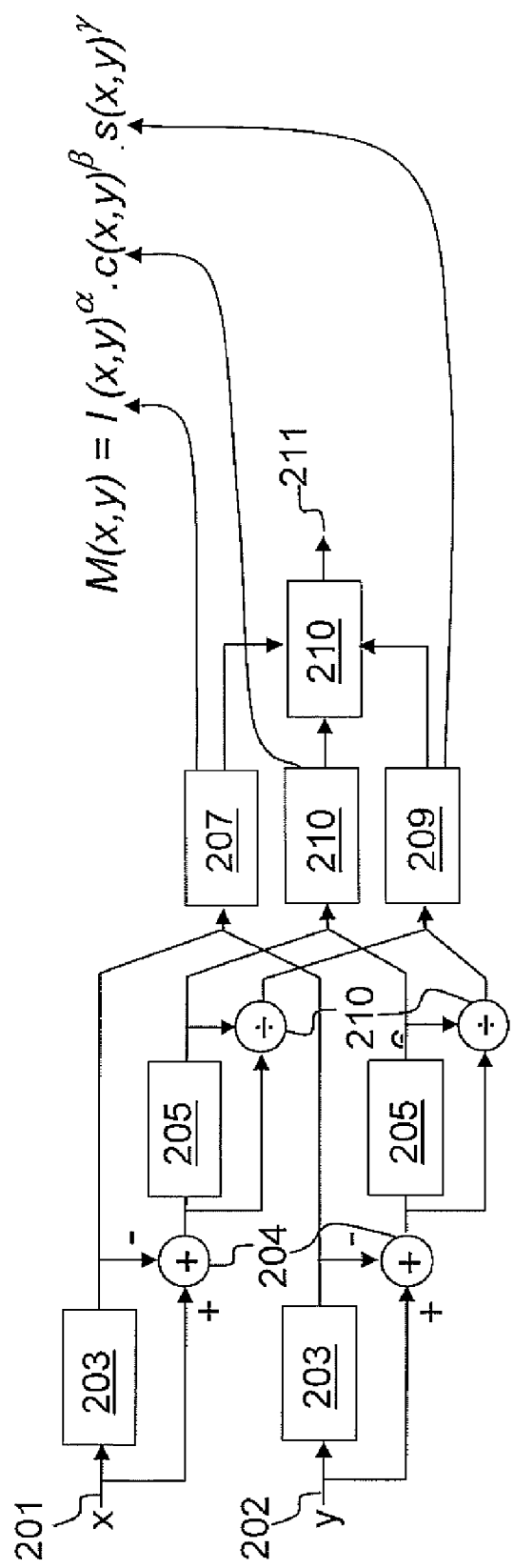

FIG. 2 schematically represents the calculation steps performed to estimate the perceived quality between a reference image x 201 and the same image y 202 subjected to distortions due to a loss compression or to a transmission over a channel subject to disturbances. Said images are extracted from a video sequence. The metric used relies on a calculation that evaluates the luminances and the contrasts of the images of the reference sequence and of the sequence obtained after the successive compression, reception and decoding steps. An estimation of the structure of the content of the two sequences is also made in order to take into account the information available in the sequence as a whole without being limited to just the information contained in an isolated pixel. A measurement of the luminance 203 of the two images is performed, for example by calculating an estimate of the average intensity. The result of this measurement is then subtracted 204 from each of the images in order to produce a new image signal on which a measurement of the contrast 205 is performed, for example by a calculation of the standard deviation of said signal. Finally, a normalization 206 is performed by dividing said signal by the measurement of the contrast 205 performed. The new signal resulting from this normalization corresponds to an estimate of the structure of each image.

The respective results of the three measurements of luminance 203, contrast 205 and the normalized signal representing the structure of the image are supplied as input to three comparison modules. A first module 207 compares the luminances of the two image signals 201, 202. A second module 208 compares the contrasts and a third module 209 compares the structures. Finally, a combination system 210 produces, from the three comparisons, a metric of the perceived quality of the image 202 y with respect to the reference image 201 x. This metric is formulated using the following relationship:

$$M(x,y) = l(x,y)^\alpha, c(x,y)^\beta, s(x,y)^\gamma \quad (1)$$

in which l(x,y) represents the comparison of the luminances of the signals x and y, C(x,y) represents the comparison of the contrasts of the signals x and y, S(x,y) represents the comparison of the structures of the signals x and y, and the coefficients $\alpha,\beta,\gamma$ are strictly positive integers determined by simulation.

The function for comparing luminances is, for example, given by the following relationship:

$$l(x, y) = \frac{2\mu_x \mu_y + C_1}{\mu_x^2 + \mu_y^2 + C_1} \quad (2)$$

in which $\mu_x$ and $\mu_y$ are the average intensities of the signals x and y, and $C_1$ is a constant determined by simulation.

The function for comparing contrasts is, for example, given by the following relationship:

$$c(x, y) = \frac{2\sigma_x \sigma_y + C_2}{\sigma_x^2 + \sigma_y^2 + C_2} \quad (3)$$

in which $\sigma_x$ and $\sigma_y$ are the standard deviations of the intensities of the signals x and y, and $C_2$ is a constant determined by simulation.

Finally, the function for comparing structures is, for example, given by the following relationship:

$$s(x, y) = \frac{\sigma_{xy} + C_3}{\sigma_x \sigma_y + C_3} \quad (4)$$

in which $\sigma_{xy}$ is the coefficient of correlation between the intensities of the signals x and y, and $C_3$ is a constant determined by simulation.

Measuring the Perceived Quality of a Flux Having Scalability and Transmitted Through a Constrained Environment In addition to the influence of the compression steps, and notably the quantization, which is measured by the perceived quality estimated according to the metric described previously, a video sequence may also be subject to disturbances linked to its transmission through an imperfect channel. This is referred to as the perceived video quality on reception, or PQoS, quality of service perceived by the final user.

As was proposed in the reference [1], the expression of the average that is hoped for the end-to-end distortion after the coding of the source, the packetization in the network, the channel coding operation, followed by the impact of the channel (modeled) and the converse operations, can be used as a measurement to compare different embodiments in the compression/protection choices for the sequence to be transmitted.

So as to obtain enough data to work, and to do so in particular in the case of an application with protection unequal to the errors, for which it is important to predict the relative proportions of each of the partitions, but to ensure that the prediction of the compression bit rate works and above all is averaged over a number of frames, the optimization proposed hereinbelow is executed on the basis of a bit rate calculated group of images (GOP) by group of images. Without departing from the framework of the invention, it is obvious that, with minor modifications, the explanations below can be applied to images that do not consist of groups of images but which are in another format.

The document [1] teaches that the "sensitivity" for a GOP made of intra I frames followed by N predicted P frames is expressed by taking into account the fact that, in practice, the sensitivities of the P frames depend on the preceding frames: if a P frame is not correctly received, then the following frames, even if they have been transmitted correctly, will not be correctly reconstructed. The term sensitivity for an image or a frame here refers to the measurement of the distortion introduced relative to the uncompressed original video sequence in the case where the image or frame concerned is lost or errored. In practice, it is assumed in the calculation of the sensitivity that, when a frame is lost, its partial distortion degrades the average distortion of the GOP sufficiently for the contribution of the distortion of any subsequent frames to become negligible. The impact of the preceding frames which have not been correctly received is consequently taken into account by using a probability conditional on the preceding ones to be corrected. This leads to the expression, for the standard coded sequence in $IP_N$ (intra, predicted) format for the average distortion of a GOP $$\hat{D}_{gop} = \prod_{i=0}^{N}(1-P_e)^{\beta_i n_i} \cdot D_0 + \qquad (5)$$

$$\sum_{i=0}^{N}\left[\prod_{j=0}^{i-1}(1-P_e)^{\beta_j \cdot n_j} \cdot (1-(1-P_e)^{\beta_i n_i}) \cdot D_{loss_i}\right]$$

with $n_i$ being the size of the $i^{th}$ P-frame, with $D_{lossi}$ being the distortion observed when the $i^{th}$ P-frame is lost whereas the preceding frames are correct, with $D_0 = D_{0_N}$ being the average distortion of the error-free GOP, with $\beta_i$ being the fraction of the frame which can be partially noise-affected without desynchronization of the stream and for a channel without memory with a probability of error for the bit $P_e$.

With the experimental values estimated in [2] for the parameters $\beta_i$, or: $1-\beta_0 \approx 0.25$ and $1-\beta_i \approx 0.15$), it appears that the equation (5) can be used provided that, for all the i, the values of the size of the $i^{th}$ P-frame $n_i$, the distortion observed when the $i^{th}$ P-frame is lost whereas the preceding frames are correct $D_{loss}$ and finally the average distortion of the error-free GOP $D_0$ are known.

The relationship (5) therefore defines the average distortion of a GOP in the case of a compressed stream having a single resolution.

As introduced previously, a new generation source coder can generate a compressed stream which intrinsically has a number of resolutions, temporal and/or spatial, nested in hierarchically organized subsets. In the case of such a stream, the average distortion of a GOP can be evaluated by the following relationship, adapted from the equation (5):

$$\hat{D}_{gop} = \qquad (6)$$

$$\prod_{i=0}^{N}\prod_{k=1}^{C}(1-P_e)^{\beta_{i,k} \cdot n_{i,k}} \cdot D_0 + \sum_{i=0}^{N}\sum_{k=1}^{C}\left[\prod_{j=0}^{N}\prod_{l=1}^{k-1}(1-P_e)^{\beta_{i,l} \cdot n_{i,l}}\right.$$

$$\left.\prod_{j=0}^{i-1}(1-P_e)^{\beta_{j,k} \cdot n_{j,k}}(1-(1-P_e)^{\beta_{i,k} \cdot n_{i,k}})D_{loss_{i,k}}\right]$$

with C being the number of resolution layers in the compressed stream (C=1 in a single-resolution case), $n_{i,k}$ being the size of the $k^{th}$ resolution layer of the $i^{th}$ P-frame, $D_{loss, i,k}$ being the distortion observed when the $k^{th}$ resolution layer of the $i^{th}$ P-frame is lost whereas the preceding frames are correct, with $D_0$ being the average distortion of the error-free GOP, with $\beta_{i,k}$ being the fraction of the frame which may be partially noise-affected without desynchronization of the stream and for a channel without memory with a probability of error for the bit $P_e$.

Naturally, in the case where an error correction is introduced, the expression of the probability of error $P_e$ will also have to be established. For example, the use of rate-compatible punctured convolution codes (RCPC codes) on a Gaussian channel with decoding at flexible inputs enables us to use the limit of the probability of error established in [3]:

$$P_e \le \frac{1}{P}\sum_{d=d_{free}}^{\infty}a_d \cdot P_d$$

With $d_{free}$ being the free distance of the code, $a_d$ being the number of existing paths, $$P_d = \frac{1}{2}\text{erfc}\left(\sqrt{\frac{d \cdot E_s}{N_0}}\right)$$

being the probability for an errored path at the distance d to be selected when $SNR = E_s/N_0$.

Similar expressions can also be established for a data partitioning or frame mixing modes, modes which can, in particular, be used in the case where a protection unequal to the errors is considered, such as the one described in the Applicant's patent application FR 2 903 253.

Estimating the Partial Distortion Length and Information

To determine an estimate of the average distortion of a GOP using the relationship (6), it is first necessary to estimate the respective lengths of each scalability layer within each frame ($n_{i,k}$), the distortion observed when the $k^{th}$ resolution layer of the $i^{th}$ P-frame is lost ($D_{loss, i,k}$) and the distortion of the GOP ($D_0$).

$D_0$ corresponds to the average distortion of a GOP due to the compression operation. This estimate is given, as a function of the quantization step QP, by the evaluation of the perceived quality metric presented supporting FIG. 2, and by doing so for each available resolution. In order to make uniform and enable the comparison and the average of the metrics for each different spatial or temporal resolution, it is necessary, before applying the calculation of said metric, to filter the current resolution to adjust it to the maximum available resolution. The filtering applied consists of a spatial interpolation in the case of an enhancement of the spatial resolution or of a temporal average in the case of an enhancement of the temporal resolution.

The total length $l_{total}$ of the GOP is determined by performing a simple division of the useful bit rate by the number of images per second in the case where the duration of a GOP is equal to one second. In a more general case, it is appropriate to multiply this result by the duration, in seconds, of a GOP.

The length of an intra frame $l_{intra}$ is also considered as a parameter that is known by virtue of the charts described hereinafter in the document.

The length of a predicted P frame can be determined by the following relationship:

$$l_{P_i} = \frac{l_{total} - l_{intra}}{GOP_{size} - 1},$$

in which $GOP_{size}$ is the size of a GOP.

The same proportionality principle can be applied to the different resolution layers, each having its useful bit rate and knowledge of the sizes for the intra part by virtue of the charts.

Figure 3:
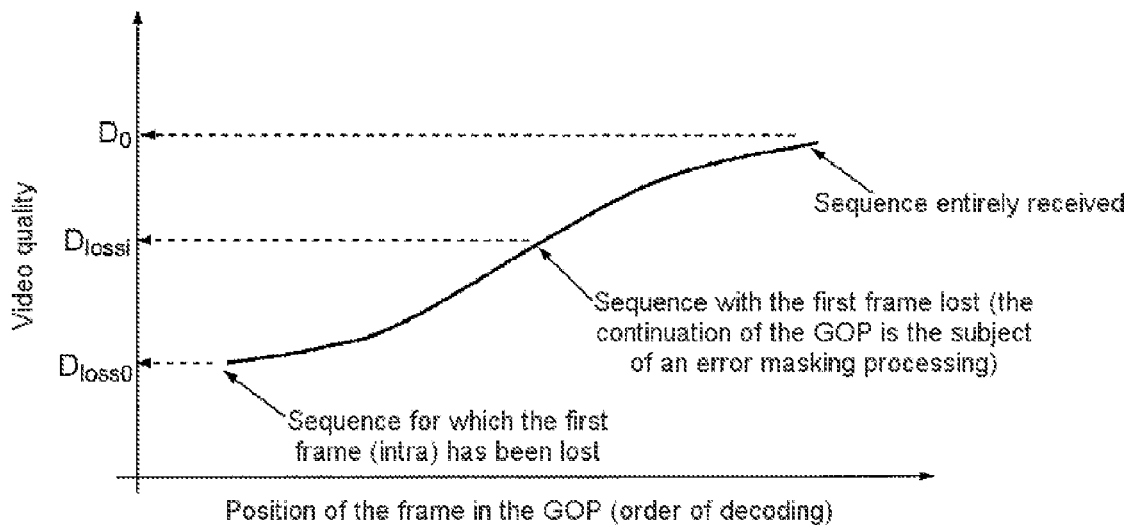

As illustrated in FIG. 3, the partial quality (expressed in terms of partial distortion) is an increasing function with the number of images decoded. As a result of experimental observations (including the remarks made in reference [1]), the following expressions are proposed and are applied in succession for the calculation of the relative contribution, in terms of distortion, of each frame for each resolution level k, beginning with the lowest resolution:

$$D_{loss_{0,k}} = \frac{1}{3}D_0,$$

$$D_{loss_{i,k}} = D_{loss_{0,k}} + \frac{i}{GOP_{size}} \times (D_0 - D_{loss_{0,k}})$$

Principle of Bit Rate and/or Quality Prediction Based on Reference Charts

One method that can be used to predict the bit rate and/or the quality of a video sequence compressed with a given resolution is described in the Applicant's patent application FR 0805513. This method is refined by the present invention in order to propose a stream-compatible solution offering temporal and/or spatial scalability. The principle of the use of reference charts to predict the bit rate and/or the quality in the case of a single-resolution stream is reviewed in this section.

In certain application cases for which the knowledge of the video sequence to be transmitted is not, a priori, known, the compression parameters can be determined via charts which give a statistical estimation of the relationships, on the one hand, between the perceived quality and the quantization step, and, on the other hand, between the useful bit rate and the quantization step for a video sequence for which the content is close to that of the sequence actually transmitted. In particular, charts can be defined for a type of sequence representing a content in which the information is significant in terms of movements and details, and, on the other hand, for a type of sequence representing a content with little information.

The quantization step parameter (QP) is the one used in the following examples but the use of charts and the method according to the invention apply similarly to any other type of compression parameter. Furthermore, the notion of quantization step parameter is a generic notion in the field of video compression and should be understood in its widest sense, that is to say, a parameter that can be used to determine the level of quantization of the compressed data and therefore, indirectly, the useful bit rate. In the following examples, the useful bit rate increases with the quantization step, but, in other cases, for a source coder which would use a different QP reference, the useful bit rate may, on the contrary, decrease when the quantization step increases. The principle of determining video quality on the basis of charts as described with the help of the following figures remains unchanged, apart from the fact that the x-axis of the curves corresponds in this second case to the inverse of QP.

Figure 4:
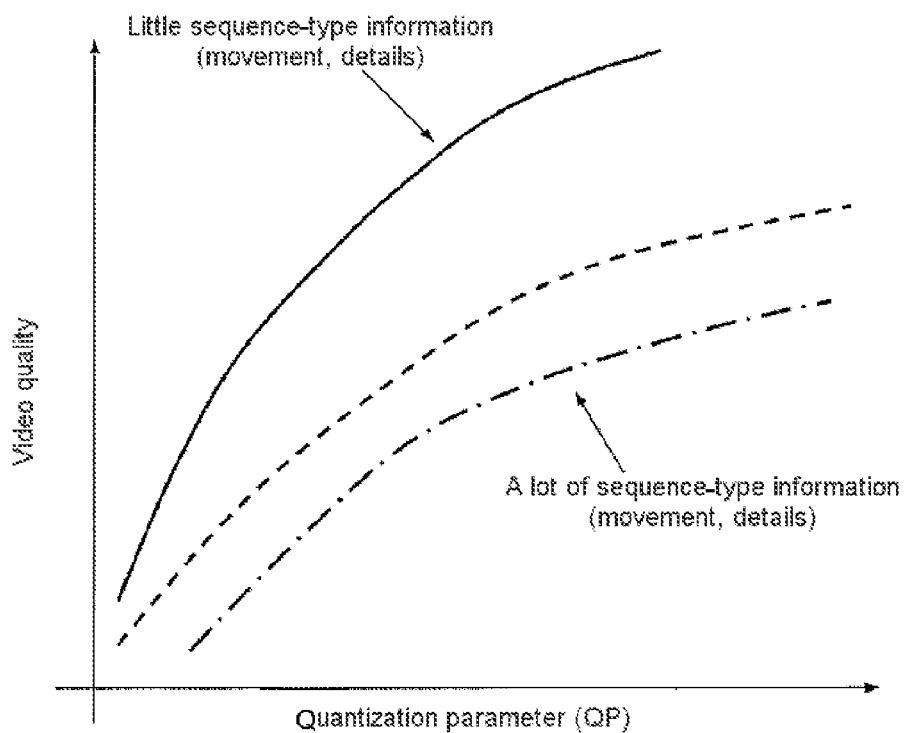

FIG. 4 illustrates the principle of the first set of charts, which give information on the video quality as a function of the quantization parameter for different video stream constructions. One of the objectives of the method according to the invention is to optimally distribute the bit rate allocated to compression and that allocated to protection. When a number of correcting codes are available, as many video quality curves are generated as there are possible rates R in order to have a number of pairs {QP,R} for the same perceived video quality. The charts of the type of FIG. 4 therefore make it possible, for a given perceived quality, to determine all the pairs {QP,R} which satisfy this criterion.

Figure 5:
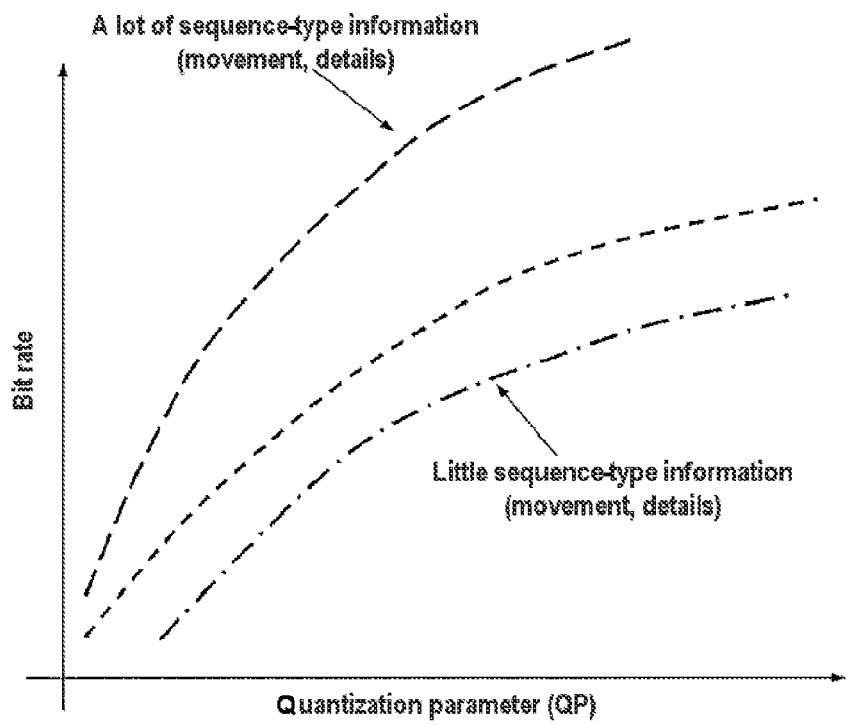

FIG. 5 then illustrates the principle of the second set of charts, supplying information on the bit rate as a function of the quantization parameter for the same video stream constructions. This type of chart can be used to determine the useful bit rate as a function of the QP parameter. In conjunction with the information obtained with the charts of FIG. 4, there are therefore obtained, for a given perceived quality value, a number of solutions defined by a useful bit rate value and a bit rate value allocated to the protection which is obtained directly from the value of the rate R of the corrector code.

Another possible use of the charts consists in defining a total target bit rate, including the useful bit rate and the protection bit rate, not to be exceeded, and, based on this target bit rate, determining the best useful bit rate and bit rate allocated to protection values with which to obtain the best perceived quality.

The next section details a number of cases for the determination of QP as a function of the useful bit rate (chart of FIG. 5).

The charts of FIGS. 4 and 5 can be used, for any starting point (default values, information from the preceding GOP, etc.), to establish the reference curve which will be used to determine the hoped-for bit rate based on the possible quantization parameters QP and the corresponding hoped-for video quality.

In practical terms, the curves can be used as follows:
to find the possible quantization parameter QP for a target bit rate on an identified curve,
for an identified curve, the chart is read and the corresponding best QP (the closest candidate of the chart) is selected for the test. Although the chart relates to a wide range of possible QPs and bit rates, these values are not continuous, thus, basically, it is possible either:
1) to find a construction of the bit rate that is fairly close to the target bit rate to observe its definition to within the margin,
2) to not be in position to select a candidate immediately.

Figure 6:
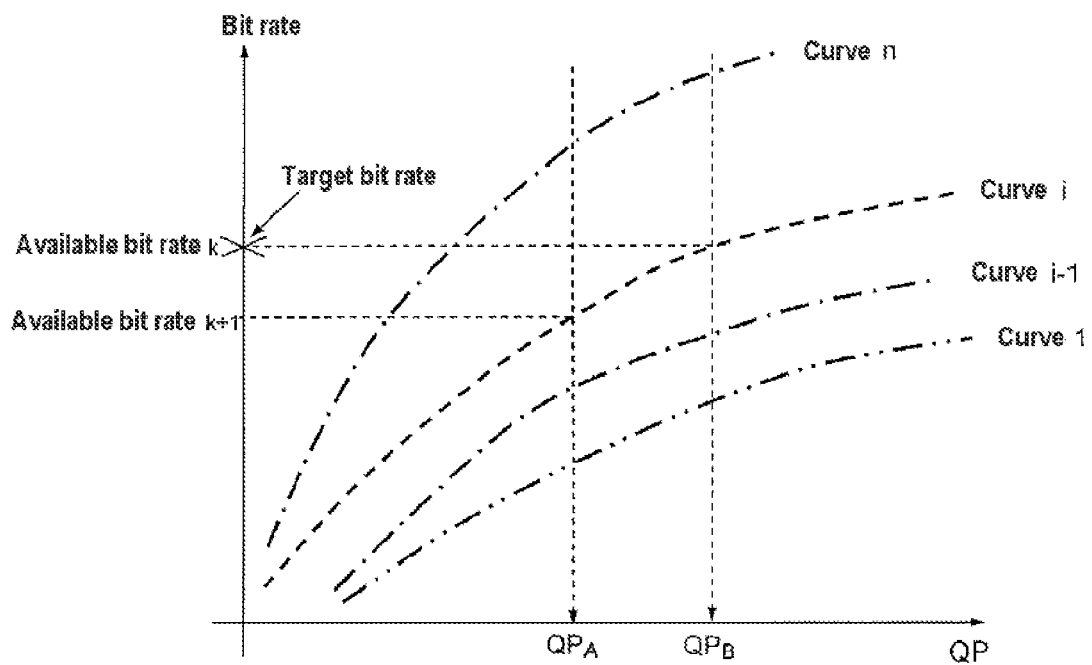
Figure 7A:
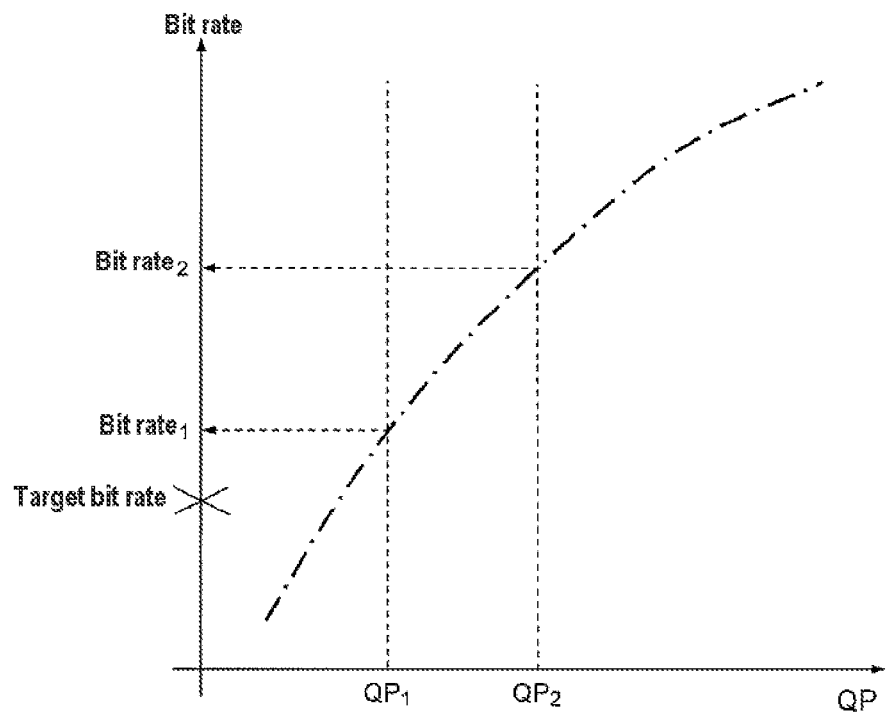
Figure 7B:
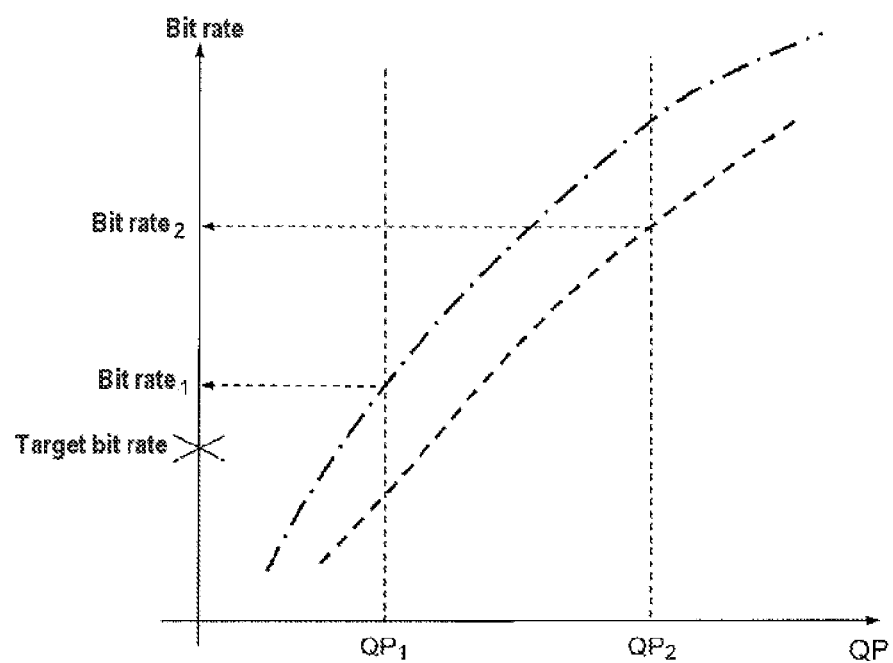
Figure 7C:
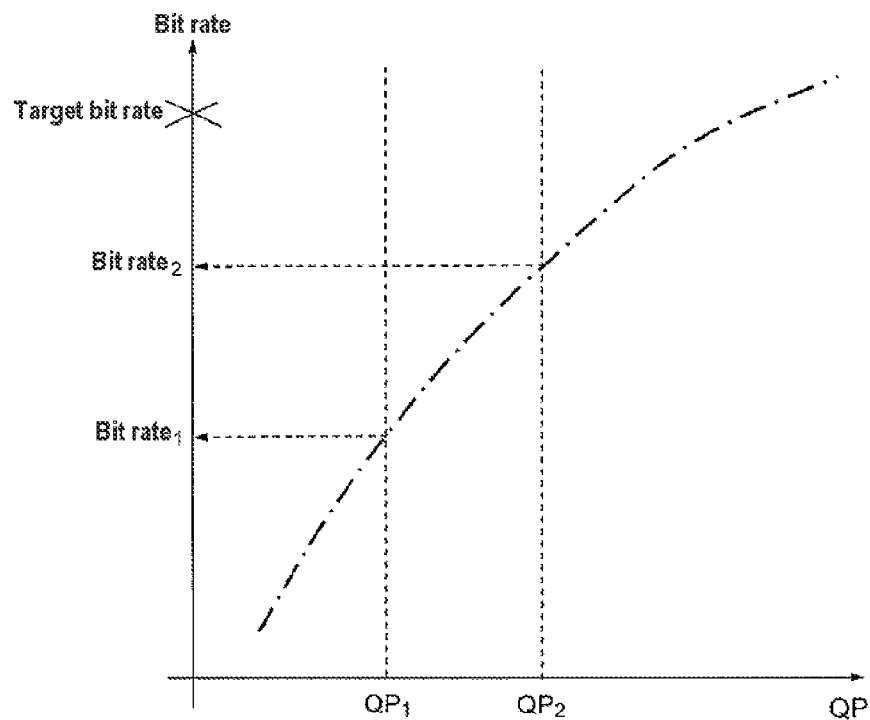
Figure 7D:
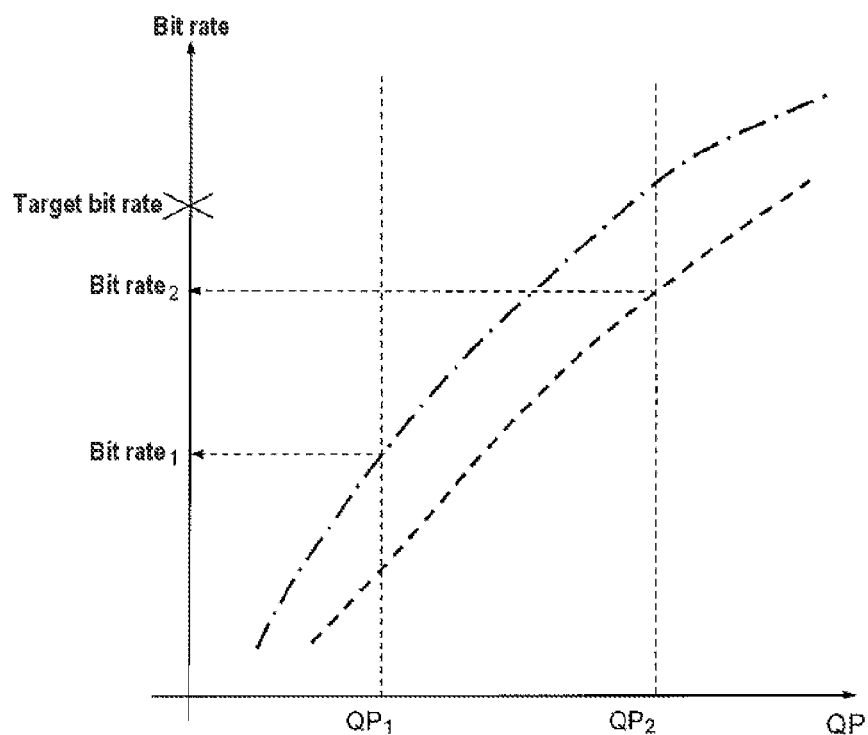
Figure 7E:
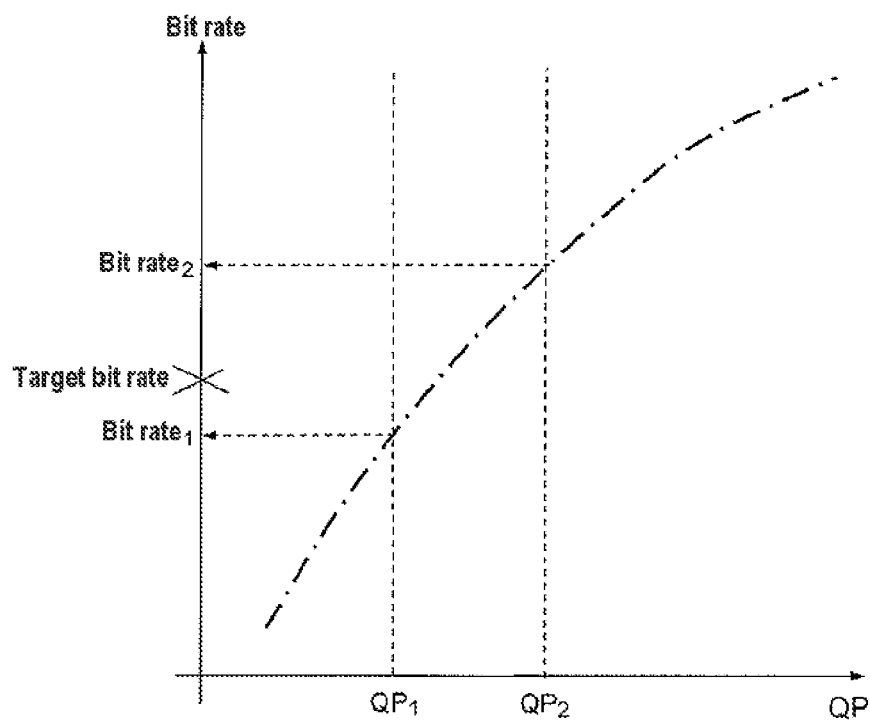
Figure 7F:
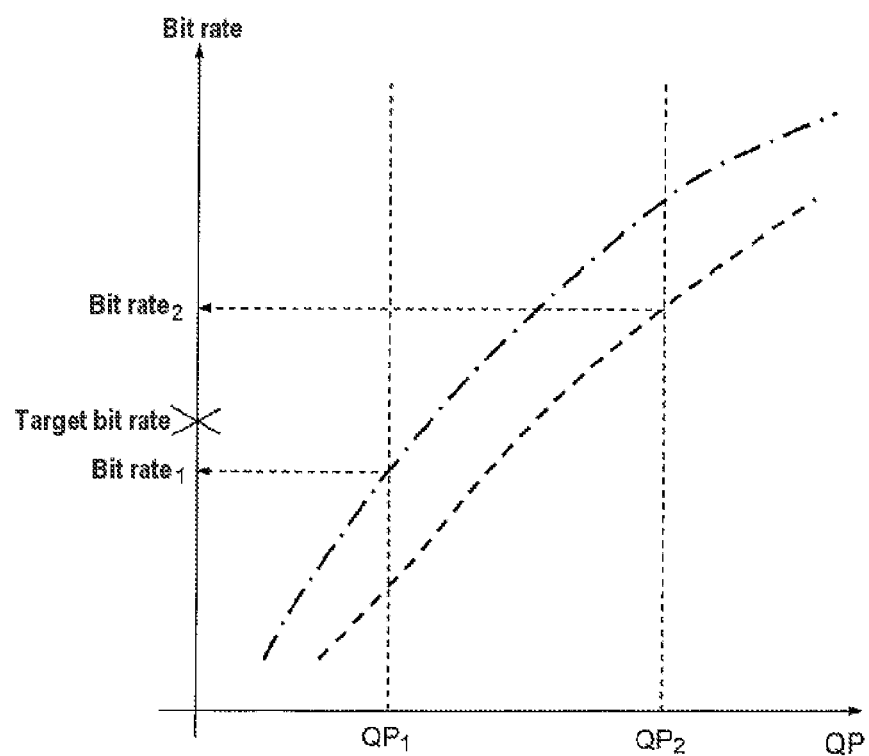

In the first case, illustrated by $QP_B$ in FIG. 6, the candidate $QP_{closest}$ is immediately selected and can be used for the encoding of the sequence. The candidate $QP_B$ is the candidate closest to the target bit rate $Db_{target}$ for the chart i, in the first example, and this corresponds to the target bit rate.

In the other cases, a refinement step must be executed which is detailed below.

Refining the Selection of the Best Quantization Parameter QP

A refinement step may be necessary, either when it is not possible to find an intermediate candidate from the initial chart of the read operation, or else when, having executed a number of tests, different pairs of constructions (bit rate, QP) have been obtained from tests on the current portion of the sequence. A number of tests can be executed, which will make it possible to determine more accurately the behavior of the portion (GOP) of the current sequence, typically if the initial prediction curve was not well chosen. However, because of the limited number of tests, necessarily imposed by the real-time and practical operation constraints, the final choice of the quantization parameter QP will often have to be made without having found the QP which perfectly corresponds to the bit rate or quality target, which means that a choice must be made with only the available knowledge. Various cases can be envisaged which have been represented in FIGS. 7a, 7b, 7c, 7d, 7e and 7f:
case 1—all the QPs tested (on one or more curves) exceed the target significantly,
case 2—all the QPs tested (on one or more curves) arrive below the target significantly,
case 3—the bit rate of the target is found between two QPs, found above a single curve,
case 4—the target bit rate is found between two QPs, found above two different curves.

For cases 1 and 2, different strategies, from the safest to the most risky, can be implemented. These strategies correspond to a similar approach: either to take the closest tested value and use it, or to try with another, by placing total trust in the chart assumed the best.

In practice, whereas it might at first glance be believed that the chart must immediately give the best QP, it must not be forgotten that the real problem is to determine, from the information from the preceding GOPs, which chart corresponds best for the current GOP of the video sequence to be coded. Since a video sequence may change greatly from one moment to another (change of scene, strong increase or reduction in movement, new details introduced, etc.), the chart that is valid at a certain instant t may in fact prove false at the next moment t+1, and therefore not allow for a good prediction.

Hereinafter in the description, an approach with a controlled risk level will be used:

in case 1, use $QP_{closest+\epsilon}$
in case 2, use $QP_{closest-\epsilon}$
with $\epsilon$ being a positive integer value predetermined by simulation. Other adaptations may be considered; for example, by choosing the increment as a function of the relative distance between the bit rate achieved with $QP_{closest}$ compared to the target bit rate;
in case 3, use a barycentric relationship:

$$QP_{lowest} + \frac{rate_{target} - rate_{lowest}}{rate_{highest} - rate_{lowest}} \times (QP_{highest} - QP_{lowest})$$

in which $rate_{target}$ is the target bit rate, and for the two candidate pairs (QP1, bit rate 1) and (QP2, bit rate 2), $rate_{lowest}$ represents the lowest bit rate, $rate_{highest}$ the highest bit rate, $QP_{lowest}$ represents the lowest quantization step and $QP_{highest}$ the highest step;

in case 4 which corresponds to the most difficult case, which in practice corresponds to a scenario in which the correct chart for the sequence that has to be coded has not been able to be determined. Here, once again, the barycenter calculation operation proposed for case 3 is possible, but may prove less effective if the optimum curve has a slope that is very different from the selected curve or indeed from the two selected curves. Another solution consists, for example, in inserting into the interpolation a third point (if it is available): the three pairs (bit rate, QP) being used to define a curve on which an interpolation can be performed directly. In the tests described below, it is the barycenter formula which will be used.

FIG. 8 illustrates an example of charts representing the video quality as a function of the quantization step when a number of resolution layers are available. In the example described, three resolution layers are considered. The base layer, which corresponds to the lowest resolution, is defined by a spatial resolution QCIF and a temporal resolution equal to 15 Hz. The first enhancement layer is defined by a spatial resolution CIF (increase by a factor 2 relative to the base layer) and a temporal resolution equal to 15 Hz. Finally, the last enhancement layer proposes an increase in the temporal resolution to a frequency of 30 Hz.

Three different types of sequence are represented. The charts of the base layer are similar to those obtained for a single-resolution stream QCIF, 15 Hz such as those of FIG. 4. The charts of the first enhancement layer are determined on the one hand for a number of quantization step values of the base layer, and on the other hand for different quantization step values of the enhancement. In practice, within the compressed stream, each subset representing a temporal or spatial scalability layer is compressed by using a different quantization step. Similarly, the last resolution layer is represented by a set of charts each identified by the type of sequence, the quantization step of the base layer, that of the first enhancement layer and finally the x-axis supplies the quantization step information for the last resolution layer.

In order to produce an estimate of the video quality for all the resolutions, the latter is calculated in all cases for the highest resolution (here, the CIF, 30 Hz resolution). For this, the lower resolutions (QCIF, 15 Hz and CIF, 15 Hz) are filtered in order to produce a filtered sequence with the highest resolution, then the perceived quality metric is calculated on the filtered sequence using the relationship (6). The filtering used consists, for example, in a spatial interpolation based on the adjacent pixels in the same image or a temporal interpolation based on the adjacent pixels of the previous and subsequent adjacent images.

The charts of FIG. 8 are then used, independently for each resolution and beginning with the lowest, in the same way as in the method described in the case of a single-resolution stream.

Determining the Compression and Protection Parameters

Figure 9:
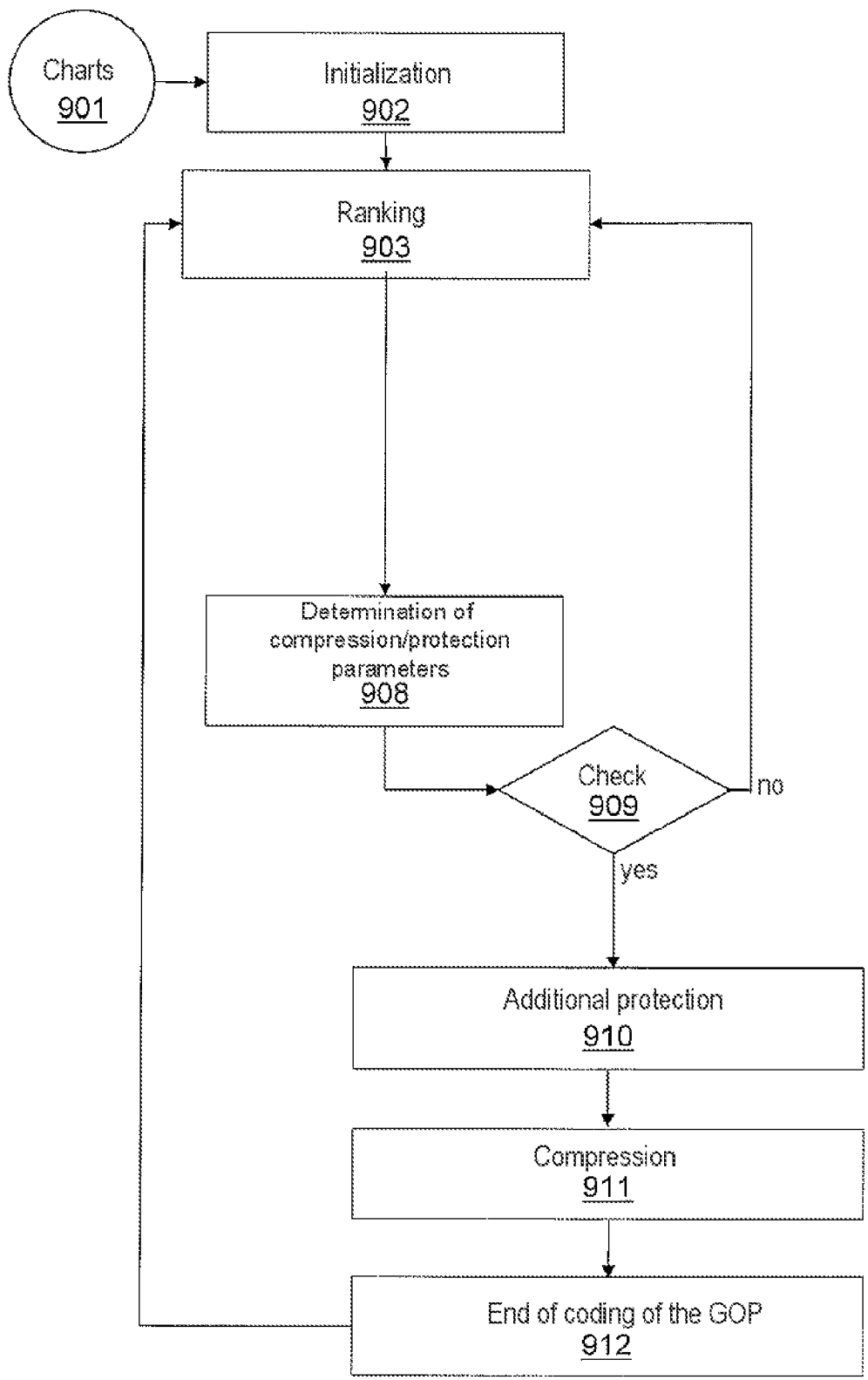
FIG. 9bis, an illustration of the ranking of the users of the system according to the useful and total bit rate allocated to each, FIGS. 10a, 10b and 10c, examples of use of the charts generated in order to determine the optimal quantization step for each resolution layer, FIG. 11, an exemplary implementation of the method according to the invention for the broadcasting of a video stream to a plurality of receivers.

FIG. 9 schematically represents the flow diagram illustrating the steps of the method according to the invention which makes it possible to determine the compression parameters, in particular the quantization step and the useful bit rate, and the protection parameters, and to do so for each scalability layer.

The method according to the invention applies for a compressed stream comprising a number C of scalability layers, this number being bounded by the value $C_{max}$ of the number of layers actually used with regard to the effectiveness of the system. Typically, a maximum number of three layers is an effective choice for a coder of H.264/SVC type.

Based on the refined perceived quality metric, it is possible to define a minimum acceptable quality value $D_{min}$ for the system considered and a maximum quality value $D_{max}$, for each resolution layer, beyond which an increase in bit rate no longer has any significant effect in enhancing the quality. The maximum quality $D_{max}$ can also be determined in relation to the requirements of the targeted system. In the case where the metric described in support of FIG. 2 is used, typical values that can be used for $D_{min}$ and $D_{max}$ are, for example, $D_{min}$=0.7 and $D_{max}$={0.75, 0.9, 0.98} for, respectively, spatial and temporal resolution pairs (QCIF 15 Hz), (CIF 15 Hz) and (CIF 30 Hz).

The method according to the invention advantageously applies to the case of a broadcast of the same compressed stream to a plurality of recipients, and via a known number of communication links. A number of users may be grouped at the end of one and the same link. Hereinafter, a strictly positive number K of communication links are considered, each defined by the pair of parameters $\{d_i, Pe_i\}$ which respectively represent the bit rate available on the link of index i and the probability of error occurring on this same link.

Preparation of the Charts

In a preliminary step 901, all the charts introduced in FIG. 8 are generated for each scalability layer. These charts are obtained by varying the quantization steps of the source coder for different reference sequences, representative of the usage scenarios considered or, by default, taken from a set of sequences conventionally used by those skilled in the video coding art. For example, the sequences "foreman" or "akyio" are reference sequences conventionally used to perform routine tests in the field of video compression. The two types of charts mentioned in FIGS. 4 and 5 are generated, namely a first chart representing the perceived quality as a function of the quantization step of the scalability layer considered and a second chart representing the useful bit rate as a function of this same quantization step.

It will be noted that the charts are valid only for the coder which has enabled them to be generated. In case of use of a number of different coders, the charts of each coder must be generated before starting the method for determining the compression and protection parameters. In the case where the charts do not actually correspond to the source coder used, a performance degradation should be expected even though the implementation of the method according to the invention remains unchanged. The values of $D_{min}$ and $D_{max}$ are deduced from these charts.

In a variant embodiment of the invention, the video sequence actually transmitted is known to the controller, which is the device executing the method according to the invention, and in this case the relationship between the video bit rates and qualities is determined for each GOP and for a set of compression parameters to be applied to the sequence. The use of a chart is then not necessary.

Initialization

In an initialization phase 902, the parameters representative of the source coder, notably the values of $C_{max}$, $D_{min}$ and $D_{max}$, are entered. A reference sequence and its associated charts are chosen so as to best represent the scenario considered. The charts may be accompanied by information relating to the resolutions recommended with respect to the various constraints of the system, notably in terms of bit rate and of error rate. In a variant embodiment, a group of reference sequences may be selected and an average is then calculated on the charts of said group in order to produce a reference chart that can be used to initialize the method. The compression parameters are initialized with the default parameters representative of the scenario considered, in particular the number of resolution layers and their associated bit rates.

Ranking

One of the objectives of the method according to the invention is to assign each transmission link and/or each user a scalability layer with given compression and protection parameters based notably on the available bit rate and the probability of error affecting these links.

In a ranking step 903, the K users associated with at most K distinct transmission links and each defined by the pair of parameters {available bit rate, probability of error affecting this link} are arranged in ascending order of perceived quality. A quality metric is determined for each of the users $U_i$ using the relationship (1) and by taking into account either the compression/protection parameters of the initialization phase or those determined by the method according to the invention previously, for example in the preceding second.

In a substep 903.1, for each user $U_i$ and for each available resolution, the available bit rate and the probability of error are used to calculate the pair {useful bit rate, protection bit rate} which offers the best possible quality by using the charts of the type of FIGS. 4 and 5 and the relationship (6) and by applying the method described previously. More specifically, the available bit rate information can be used to generate a defined number of pairs {useful bit rate, protection bit rate} for which the sum does not exceed the available bit rate and which are compatible on the one hand with the possibilities offered by the source coder in terms of bit rate scalability and on the other hand with the available correcting codes. In a second stage, the charts of FIGS. 4 and 5 can be used to obtain, for each useful bit rate, an estimation of the average quality $D_0$ of an error-free GOP. The relationship (6) can then be used, for each available resolution and for each available correcting code rate, to deduce therefrom the estimated perceived quality for a transmission on a given channel and a stream protected by a correcting code of such rate. The pair {useful bit rate, protection bit rate} finally retained is that which gives the best estimated perceived quality out of those determined. The perceived quality is determined, for each resolution, relative to the uncompressed reference sequence with maximum resolution as explained in the preceding section associated with FIG. 2.

In a substep 903.2, still for each user $U_i$, the resolution $C_{best}$ then retained is that which corresponds to the best perceived quality obtained. The user $U_i$ is then defined by the pair of useful bit rate and total bit rate parameters ($Db_{useful}$, $Db_{total}$).

In the case where a stream is considered which comprises only useful data and a rate redundancy section R, the total bit rate is obtained by the relationship $Db_{total}=Db_{useful}/R$. In the case where other data are contained in the bit stream considered, in particular header data for the network encapsulation, these data must obviously be taken into account in the total bit rate calculation. If one of the users $U_i$ has a perceived quality value below the required minimum threshold $D_{min}$, then it is excluded from the ranking step 903.

In a substep 903.3, the users $U_i$ retained on completion of the preceding steps 903.1 and 903.2 are then ranked on a two-dimensional graph, of x-axis $Db_{useful}$ and y-axis $Db_{total}$ as represented in FIG. 9*bis*. This representation makes it possible to define a function f such as $Db_{total}=f(Db_{useful})$. There are then two possibilities.

If the function f is strictly increasing over all the points corresponding to the users retained, then the following ranking method is applied.

Substep 903.4

The K users are grouped together in homogeneous groups on the basis of the perceived quality metric obtained and in such a way that a minimum quality difference is observed between each group and that the perceived quality does not exceed a maximum threshold between each element of a group defined in this way. $\chi$ is used to denote the number of groups determined. There are then a number of possibilities.

If $\chi=1$, a single resolution transmitted to all the users is the best solution, all the more so since the compression by scalability layers results in an increase in the useful bit rate relative to the same stream directly compressed with the single highest resolution. However, the available resolutions may be divided up between the different elements of the group by associating the lowest resolution layers with the transmission links offering the lowest quality metric, and vice versa. One possible choice consists in taking two resolution layers (C=2), or at most three classes (C=3).

If $2\leq\chi\leq C_{max}$, a number of resolution layers $C=\chi$ is chosen, and each group is assigned a resolution layer based on their associated quality metric. The lowest resolution is assigned for the lowest metric, and vice versa.

If $\chi>C_{max}$, the number of resolution layers is limited to $C=C_{max}$. The low resolution is, for example, assigned to the first group, in the ranking order established previously, for which the quality metric exceeds the value of $D_{min}$. The highest resolution is, for example, assigned to the group obtaining the best quality metric, and the other intermediate resolution layers are divided up evenly between the groups ranked between the two groups identified previously. Depending on the specific requirements of the system, it is also possible to prioritize certain users or groups of users and therefore to adopt a less uniform division of the resolution layers.

If the function f is not strictly increasing, then the requirements of the different users are more difficult to reconcile. Choices must be made which potentially will degrade the service offered to one or more users to guarantee an overall minimum service. This is due to the fact that, for one and the same perceived quality value, two users may have a very different division between the useful bit rate and the protection bit rate. If the ranking described previously is applied, these two users will be in the same group and will benefit from the same useful bit rate and correcting code rate even though their needs are different.

Substep 903.5

When the curve f shows a decrease between two consecutive points, this illustrates a significant variation of the ratio between the useful bit rate and the protection bit rate. In FIG. 9*bis*, this case corresponds to the users U2 and U3 or even to the users U0 and U1. U2 (respectively U0) has a lower useful bit rate than U3 (respectively U1) but a higher total bit rate. Once the homogeneous groups have been determined, for each of the groups, a check should therefore be made to see if the function f is increasing over all the points. If a number of consecutive points do not agree with this increase, then the composition of the group should be modified according to one or more of the following variants.

In a first variant embodiment of the invention, for the users concerned, the step 903.2 is executed again by choosing a resolution other than that initially chosen, and this is done in order to determine a solution which renders the function f increasing.

In another variant embodiment of the invention, and/or in the case where the first variant has not provided convergence toward a solution, a degraded virtual user U'a is introduced. In the example of FIG. 9*bis*, the virtual user is determined from the two users U0 and U1 which show a decrease in the function f. The virtual user is determined in such a way as to hold to the two constraints and is selected as representative in replacement of the two users U0 and U1. The total bit rate of the virtual user is equal to the minimum total bit rate, or that of U1 in the example. The protection rate of the virtual user is equal to the minimum protection rate, or that of U0 in the example. The following therefore apply: $Db_{total}(U'a)=Db_{total}(U1)$ and $Db_{useful}(U'a)=Db_{total}(U1)\cdot Db_{useful}(U_0)/Db_{total}(U_0)$.

In another variant embodiment, from the consecutive users which do not agree with the increase in the function f, the user which shows the highest total bit is eliminated from the group and is not taken into account in the ranking step.

If the function f between two users of one and the same homogeneous group shows a slope greater than 1, the determination of the pair (useful bit rate, protection rate) suited to these two users may also lead to the introduction of a virtual user for which the total bit rate is equal to the minimum total bit rate and the protection rate is equal to the minimum protection rate of the two users.

However, this case is improbable in light of the conventional performance levels of the wireless networks, which generally offer a bit rate adaptation linked to the quality of service that they can offer. This particular rare case will therefore be able to be dealt with directly by the determination of a trade-off between the users of the homogeneous group, without having to also try to change the resolution of one of the users or to eliminate from the ranking the user with the highest total bit rate.

Determination of the Compression/Protection Parameters

Once the ranking step 903 has made it possible to specify a division of the resolution layers on each of the communication links with a priori achievable bit rate and quality constraints, a step 908 for determining the compression and protection parameters is then executed.

The determination of the best compression and protection parameters corresponds, in the example described, to the quantization step for each resolution layer of the stream to be compressed and the best correcting code rate to be applied. This allocation is made on the basis of the charts generated previously. The quantization step of each resolution layer is determined relative to the lowest available bit rate out of those of the transmission links that make up the group of links to which said resolution layer was assigned on completion of the ranking step 903. The resolution layers are processed in ascending order of the resolutions, starting with the lowest resolution layer, then the higher resolution layers. In practice, once the optimum quantization step is determined for the base layer, this makes it possible to isolate a single reference chart for the next layer and so on, each time retaining only the points of the charts that agree with the compression parameters chosen for lower layers.

Once the quantization steps have been determined, the protection rate to be used, for a given resolution layer, is chosen by taking the lowest protection rate out of those assigned to the users of the homogeneous group corresponding to this resolution layer.

On completion of the step 908, the minimum compression and protection parameters are defined for each of the available resolution layers.

Verification

In a verification 909 or checking step, the choices of compression parameters made previously are validated in order to prepare the final coding phase. The perceived quality metric is evaluated for each resolution layer compressed with the chosen quantization steps. A check is carried out to ensure notably that the quality estimates show values that are actually between $D_{min}$ and $D_{max}$ and that the quality deviation between two resolution layers is sufficient to justify the addition of an enhancement layer. If one of these three criteria is not satisfied, there is a loopback to the step 903 in order, possibly, to determine another configuration of choice and of division of the resolution layers.

Additional Protection

When, in a group, a number of transmission links are characterized by different pairs (bit rate, probability of error), the allocation of the compression and protection parameters is made by taking into account the transmission link for which the available bit rate is the lowest. If other links have a higher bit rate but a lower probability of error, the division of the bit rate allocated to compression and to protection will not be the same even though the measured perceived quality is similar. In this case, a possible addition of additional protection 910 is made in order to guarantee, for each transmission link, that the perceived quality will be much greater than the required minimum threshold $D_{min}$. This addition may be made through a correcting coding mechanism allowing for incremental redundancy, such as, for example, the RCPC (Rate Compatible Punctured Codes) or RCPT (Rate Compatible Punctured Turbo Codes) codes.

Compression

Once the compression and protection parameters are determined for each resolution layer and each transmission link, the actual compression operation is performed (step 911).

If necessary, if the bit rate constraints are not satisfied, the bit rate may be adapted more finely, for example by deleting certain frames so as to remain within the bit rate constraints.

Exemplary Embodiments

Figure 10B:
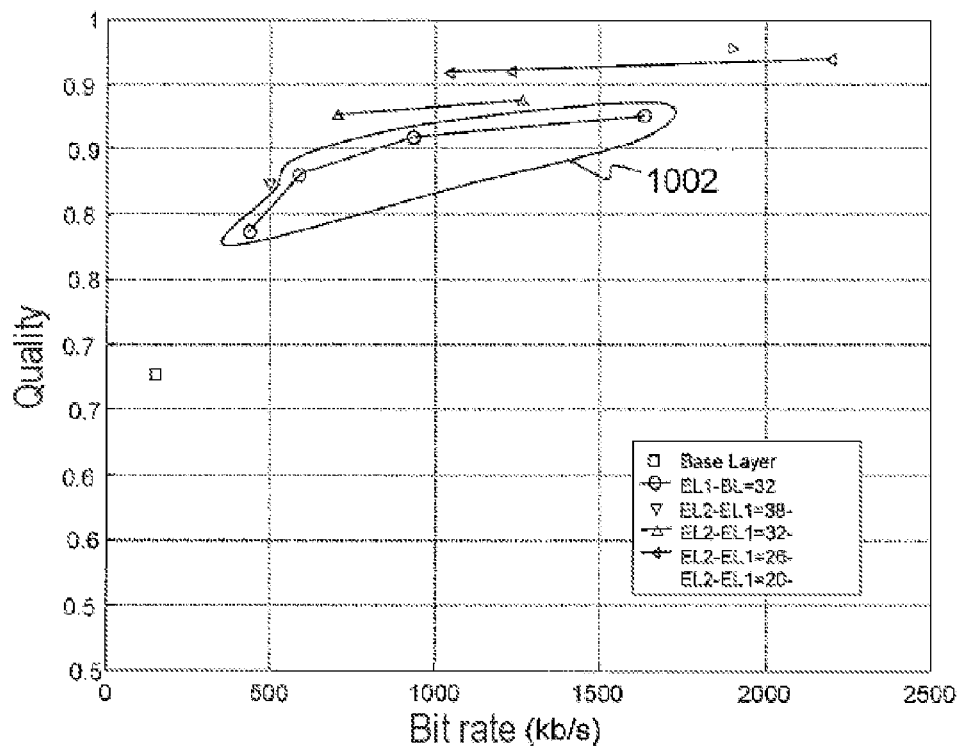
Figure 10C:
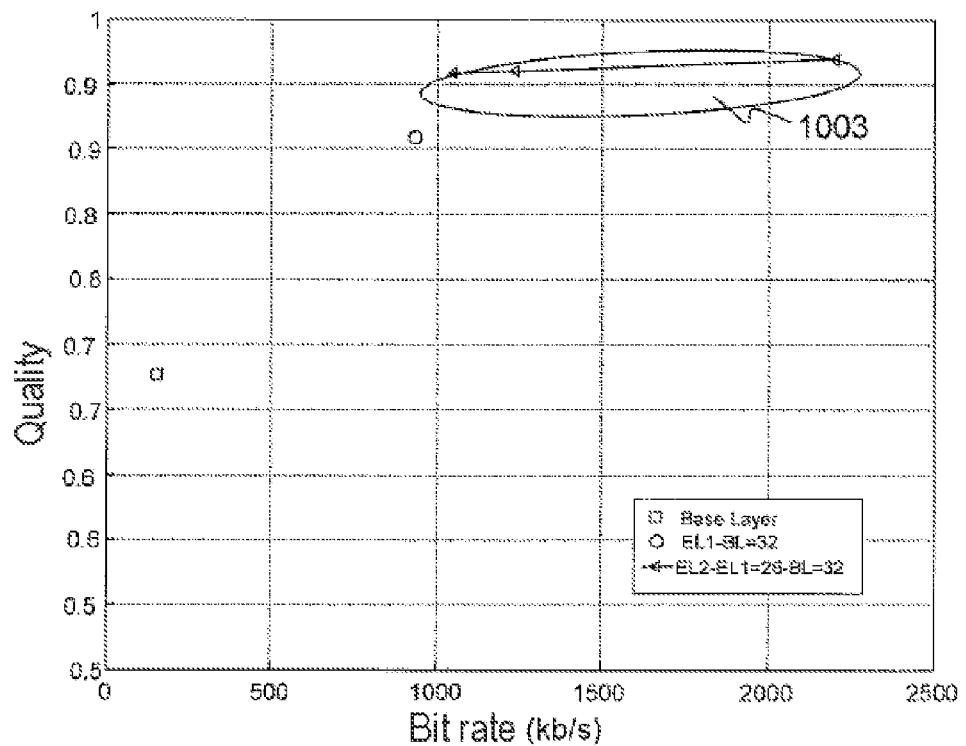

FIGS. 10*a*, 10*b* and 10*c* represent an example of a set of charts, of the same type as those of FIG. 8, and their use for the estimation of the perceived quality and the allocation of the quantization step of each resolution layer.

The set of charts of FIG. 10a represents the perceived quality estimated for each resolution layer of the compressed stream. The measurement points that make up the charts are obtained by applying a quality estimation such as that described in support of FIG. 2 on the video sequence decoded with each of the available resolutions then possibly filtered with the highest resolution. In the example of FIG. 10a, three resolutions are considered. The lowest resolution is represented by the points referenced "BL" or "Base Layer", the intermediate resolution is represented by the points referenced "BL_EL1" and the highest resolution is represented by the points referenced "BL_EL1_EL2". Thus, to obtain the necessary measurements, the video sequence decoded with the low and intermediate resolutions is filtered spatially and/or temporarily in order to obtain a sequence with the highest resolution in order for the perceived quality estimation calculation to then be applied to it.

In application of the method according to the invention described in support of FIG. 9, the quantization step is firstly determined for the base layer by considering the chart 1001 representing the perceived quality for the lowest resolution as a function of the quantization step. Then, the first enhancement layer is considered and a single chart 1002 is isolated that corresponds with the choice of the quantization step determined for the preceding layer. Once again, the best quantization step for the enhancement layer is determined. Similarly, a single chart 1003 is then isolated for the last resolution layer and the corresponding quantization step is also identified.

Application

Figure 11:
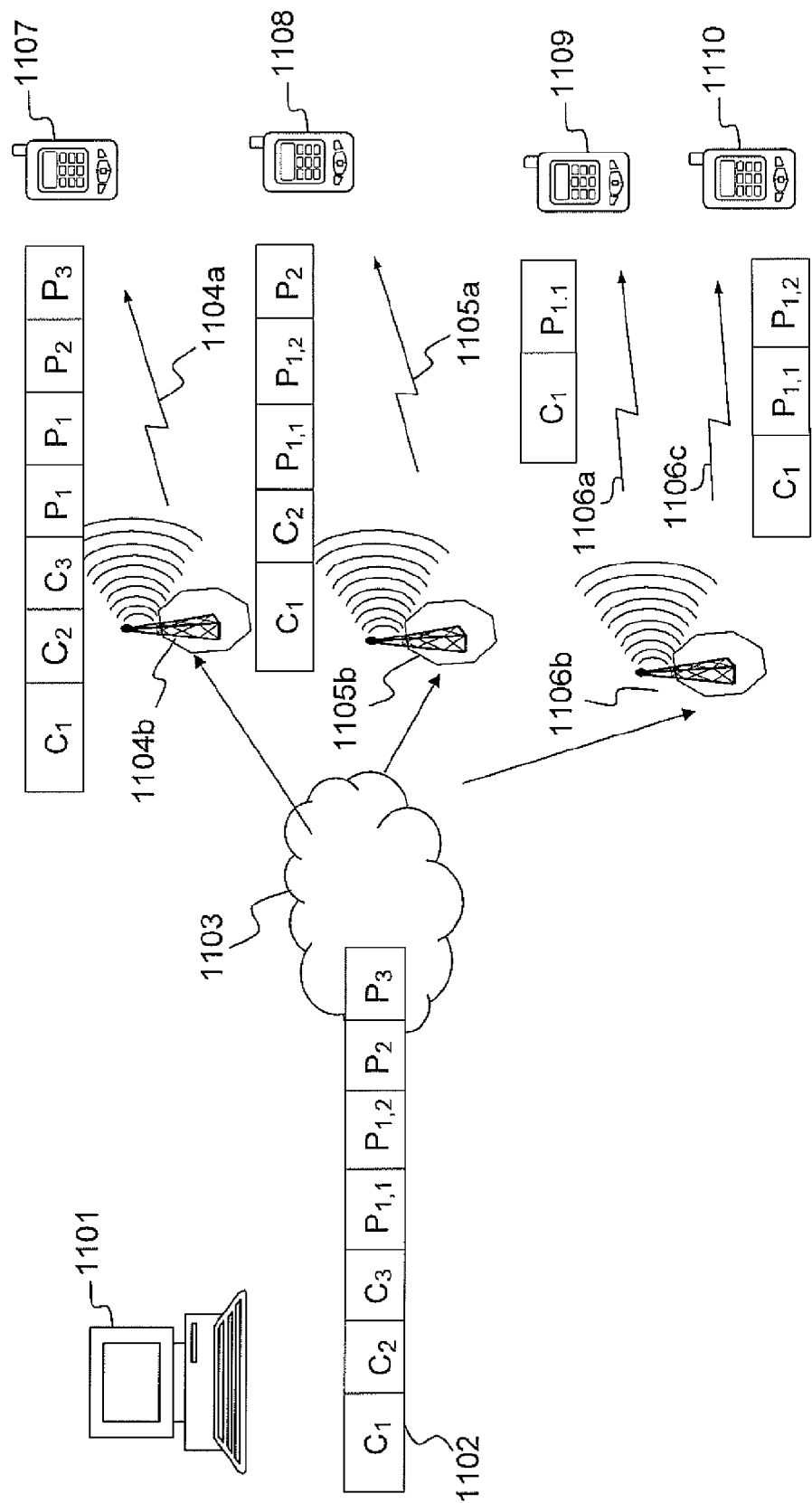

FIG. 11 describes an example of the application of the method according to the invention. A video server 1101 notably comprises a video coder designed to generate a compressed stream with temporal and/or spatial scalability, an error correcting code being used to protect a bit stream by the addition of redundancy and a controller whose function is to determine the compression and protection parameters of the coded stream and which, for this purpose, executes the steps of the method according to the invention. The controller is executed by a processor coupled to means for storing one or more video sequence charts necessary for the implementation of the method according to the invention.

The compressed video stream 1102 is thus generated; it comprises a number of subsets respectively representing the base layer $C_1$, an enhancement layer $C_2$ and a third layer $C_3$ making it possible to achieve the highest resolution. The compressed stream also comprises redundancy sections generated by said channel coder. These different portions may be either contiguous or interleaved, and possibly will have added to them the headers needed to identify them and to allow for their packetization for transmission over the transmission network. Let us assume that the method according to the invention has culminated in the following division of the resolution layers according to the available transmission links 1104a, 1105a, 1106a and 1106c. The base layer $C_1$ is allocated to the links 1106a, 1106c at the ends of which two users 1109, 1110 are located. The base layer $C_2$ is allocated to the link 1105a at the end of which a single user 1108 is located. Finally, the layer $C_3$ representing the highest resolution is allocated to the link 1104a which offers the best available bit rate and error probability characteristics and at the end of which a single user 1107 is located.

The protection allocated to the first class $C_1$ is generated in two stages, because of the two users 1109, 1110 which have different characteristics (bit rate, probability of error). Thus, the redundancy section $P_{1,1}$ is generated according to the requirements of the user 1109 and the redundancy section $P_{1,2}$ is added to mitigate the less good performance levels of the transmission channel by which the user 1110 can be reached. The enhancement layers $C_2$ and $C_3$ have a single redundancy section $P_2$, $P_3$ each of which is sufficient to guarantee a minimum perceived quality to the users 1107 and 1108.

The stream 1102 is thus transmitted through a heterogeneous network 1103 then to three base stations 1104b, 1105b, 1106b each of which comprises a transcoding device that makes it possible to adapt the bit rate of the received compressed stream 1102 to the constraints of the transmission links 1104a, 1105a, 1106a, 1106c. Because of the hierarchical encapsulation of a number of subsets, the sections corresponding to the higher resolution layers $C_2$, $C_3$ and the redundancy sections $P_2$, $P_3$ may be eliminated by the transcoding operation. The invention advantageously applies in the case of wireless transmission links which present both a variable and limited bit rate and propagation conditions which lead to a not inconsiderable probability of error on the received data. However, the invention remains compatible with wired transmission links for which the probability of error is negligible and the available bit rate is, in most cases, much higher.

REFERENCES

[1] C. Bergeron and C. Lamy-Bergot, "Modelling H.264/AVC sensitivity for error protection in wireless transmissions", Proceedings of the *International Workshop on Multimedia Processing (MMSP'06)*, pp. 302-305, Victoria, Canada, October 2006.

[2] C. Bergeron and C. Lamy-Bergot, "Compliant selective encryption for H.264/AVC video streams", *Proc. Int. Workshop on Multimedia Processing (MMSP'05)*, pp. 477-480, Shanghai, China, October-November 2005.

[3] J. Hagenauer, "Rate-compatible punctured convolutional codes (RCPC codes) and their application," in *IEEE Trans. On Comm.*, vol. 36, n. 4, pp. 339-400, April 1988.

The invention claimed is:

1. A method for determining coding parameters of a variable-resolution video stream by a video coder, said variable-resolution video stream comprising a plurality of resolution layers and being compressed to be transmitted at a plurality of given data bit rates or a plurality of given qualities through a heterogeneous network to a plurality of users, the method comprising:

generating reference charts with which to determine compression parameters, at least a quantization step, and/or protection parameters, at least a protection efficiency, as a function of a data bit rate and of a perceived quality;

initializing parameters representative of said video coder, at least a maximum number $C_{max}$ of resolution layers, a minimum acceptable quality $D_{min}$ and a maximum achievable quality $D_{max}$ for each of said resolution layers;

determining, for each user associated with a transmission link having an available bit rate $d_i$ and a probability of error $Pe_i$, and for each available resolution $C_j$, a pair {data bit rate, protection efficiency} which offers a best perceived quality based on said reference charts;

retaining, for each user, a resolution $C_{best}$ which offers the best perceived quality and representing said user in an x-axis plane equal to the data bit rate and y-axis plane equal to a total bit rate, which has a minimum value equal to the data bit rate divided by the protection efficiency;

excluding from said representation users whose perceived quality value is below the minimum acceptable quality $D_{min}$;

evaluating a function f which links the data bit rate to the total bit rate based on the representation of said users;

if the function f is strictly increasing for all users considered, then ranking the users in homogeneous groups according to the perceived quality, the users of one and the same group are associated with the same resolution $C_{best}$;

if the function f is not strictly increasing for at least two consecutive users, executing at least one of the following steps:

modifying a retained choice of the resolution layer for at least one of said users, replacing said users with a virtual user for which the total bit rate is equal to a lowest total bit rate of said users and for which the protection efficiency is equal to a minimum protection efficiency of said users, and eliminating from the ranking the user which has a highest total bit rate;

determining, for each resolution layer of index i and in ascending order of a resolution level, compression parameters, at least a quantization step, and protection parameters, at least an efficiency of a correcting code, based on the reference charts, the quantization step being determined relative to a lowest available bit rate among the transmission links of a group of users to which said resolution layer of index i is assigned, the efficiency of the correcting code being determined as being a lowest efficiency among those allocated to the users of said group;

compressing said video stream by applying said determined compression parameters; and protecting said video stream by applying said protection parameters to it.

2. The method as claimed in claim 1, wherein a compressed video stream consists at least of I frames and of P frames and that the perceived quality is determined on the basis of the following relationship:

$$\hat{D}_{gop} = \prod_{i=0}^{N} \prod_{k=1}^{C} (1 - P_e)^{\beta_{i,k} \cdot n_{i,k}} \cdot D_0 + \sum_{i=0}^{N} \sum_{k=1}^{C} \left[ \prod_{j=0}^{N} \prod_{l=1}^{k-1} (1 - P_e)^{\beta_{i,l} \cdot n_{i,l}} \prod_{j=0}^{i-1} (1 - P_e)^{\beta_{j,k} \cdot n_{j,k}} (1 - (1 - P_e)^{\beta_{i,k} \cdot n_{i,k}}) D_{loss_{i,k}} \right],$$

in which:

N is a number of images in a group of images (GOP),

C is a number of resolution layers, $n_{i,k}$ is a size of the $k^{th}$ resolution layer of the $i^{th}$ P frame, $D_{loss\ i,k}$ is a distortion observed when the $k^{th}$ resolution layer of the $i^{th}$ P frame is lost whereas preceding frames are correct, $D_0$ is an average distortion of a group of images without error, $\beta_{i,k}$ is a predefined parameter, and $P_e$ is a probability of error on the transmission link.

3. The method as claimed in claim 2, wherein the average distortion $D_0$ is equal to a signal-to-noise ratio PSNR.

4. The method as claimed in claim 2, wherein the average distortion $D_0$ is determined as a difference between said compressed video stream at a given resolution and a noncompressed video stream at a maximum resolution among those available.

5. The method as claimed in claim 1, wherein said homogeneous groups are determined in such a way that a given minimum quality difference exists between each group.

6. The method as claimed in claim 1, the method further comprising checking choices of compression parameters, wherein checking choices comprises determining the perceived quality metric of the video stream and checking that this metric is greater than $D_{min}$ and less than $D_{max}$.

7. The method as claimed in claim 1, the method further comprising applying to said video stream a correcting coding mechanism allowing for incremental redundancy.

8. The method as claimed in claim 1, wherein said video stream has a variable spatial and/or temporal resolution and/or variable resolution in terms of quality.

9. A system for determining coding parameters of a variable-resolution video stream, the system comprising a video coder; and an attached controller configured to execute a method for determining coding parameters of a variable-resolution video stream by said video coder, said variable-resolution video stream comprising a plurality of resolution layers and being compressed to be transmitted at a plurality of given data bit rates or a plurality of given qualities through a heterogeneous network to a plurality of users, the method comprising:

generating reference charts with which to determine compression parameters, at least a quantization step, and/or protection parameters, at least a protection efficiency, as a function of a data bit rate and of a perceived quality;

initializing parameters representative of said video coder, at least a maximum number $C_{max}$ of resolution layers, a minimum acceptable quality $D_{min}$ and a maximum achievable quality $D_{max}$ for each of said resolution layers;

determining, for each user associated with a transmission link having an available bit rate $d_i$ and a probability of error $Pe_i$, and for each available resolution $C_j$, a pair {data bit rate, protection efficiency} which offers a best perceived quality based on said reference charts;

retaining, for each user, a resolution $C_{best}$ which offers the best perceived quality and representing said user in an x-axis plane equal to the data bit rate and y-axis plane equal to a total bit rate, which has a minimum value equal to the data bit rate divided by the protection efficiency;

excluding from said representation users whose perceived quality value is below the minimum acceptable quality $D_{min}$;

evaluating a function f which links the data bit rate to the total bit rate based on the representation of said users;

if the function f is strictly increasing for all the users considered, then ranking the users in homogeneous groups according to the perceived quality, the users of one and the same group are associated with the same resolution $C_{best}$;

if the function f is not strictly increasing for at least two consecutive users, executing at least one of the following steps:

modifying a retained choice of the resolution layer for at least one of said users, replacing said users with a virtual user for which the total bit rate is equal to a lowest total bit rate of said users and for which the protection efficiency is equal to a minimum protection efficiency of said users, and eliminating from the ranking the user which has a highest total bit rate;
determining, for each resolution layer of index i and in ascending order of the resolution level, compression parameters, at least a quantization step, and protection parameters, at least an efficiency of a correcting code, based on the reference charts, the quantization step being determined relative to a lowest available bit rate among the transmission links of a group of users to which said resolution layer of index i is assigned, the efficiency of the correcting code being determined as being a lowest efficiency among those allocated to the users of said group;
compressing said video stream by applying said determined compression parameters; and
protecting said video stream by applying said protection parameters to it.

* * * * *